United States Patent [19]

Barry

[11] 4,362,456
[45] Dec. 7, 1982

[54] ROTARY LOADER AND STORAGE SYSTEM

[76] Inventor: Leonard D. Barry, 19300 Pennington Dr., Detroit, Mich. 48221

[21] Appl. No.: 957,710

[22] Filed: Nov. 6, 1978

[51] Int. Cl.³ ............................ B65G 67/22; B61K 1/00
[52] U.S. Cl. ..................................... 414/334; 414/337; 414/338
[58] Field of Search ............... 414/334, 337, 338, 339, 414/383, 744 R; 104/20, 21, 28–31; 198/480

[56] References Cited

U.S. PATENT DOCUMENTS

| | | | |
|---|---|---|---|
| 1,094,060 | 4/1914 | Donovan | 414/337 |
| 1,495,339 | 5/1924 | Maher | 414/337 X |
| 3,396,509 | 8/1968 | Hötger | 198/480 X |
| 3,421,641 | 1/1969 | Frey | 414/744 R |
| 3,484,002 | 12/1969 | Barry | 104/20 X |
| 3,865,041 | 2/1975 | Bacon | 104/20 |
| 3,896,738 | 7/1975 | Dubeta | 198/480 X |
| 3,956,994 | 5/1976 | Barry | 104/20 X |
| 3,991,889 | 11/1976 | Cox | 414/339 |
| 4,065,006 | 12/1977 | Barry | 414/337 X |
| 4,124,129 | 11/1978 | Barry | 104/28 X |
| 4,130,208 | 12/1978 | Barry | 414/334 |

*Primary Examiner*—John J. Love
*Assistant Examiner*—Terrance L. Siemens

[57] ABSTRACT

This loader has one or more frames mounted to travel around a central pivot post. Each frame has preferably two fork arms extending radially out and curved inward like a gear or sprocket tooth profile to mesh between pedestals on a vehicle moved tangentially past the loader with a slope to transfer a load thereto or from according to the direction of movement. Grooved wheels support the frame on a circular cam track concentric about the pivot and are mounted on legs that swing to switch between concentric tracks having reverse slopes to transfer to or from a vehicle in either direction. Cradles on the forks have fingers to engage the side of the vehicle to align for transfer. The vehicle can have side couplers which engage behind the forward fork arm on its inner curve to gradually accelerate the loader into alignment for transfer or the loader can be powered or started to mesh its forks between the pedestals. After transfer the loader is pushed away from the vehicle by the side couplers, or the loader pushes the vehicle and turns out therefrom. The loader runs in a circle between a train and storage dollies to load or unload the train selectively nonstop. The loader can be stationary or vehicle mounted and can transfer cargo or passenger containers, dollies, or pallets for loads such as autos, semitrailers, buses of passengers, freight, etc.

23 Claims, 76 Drawing Figures

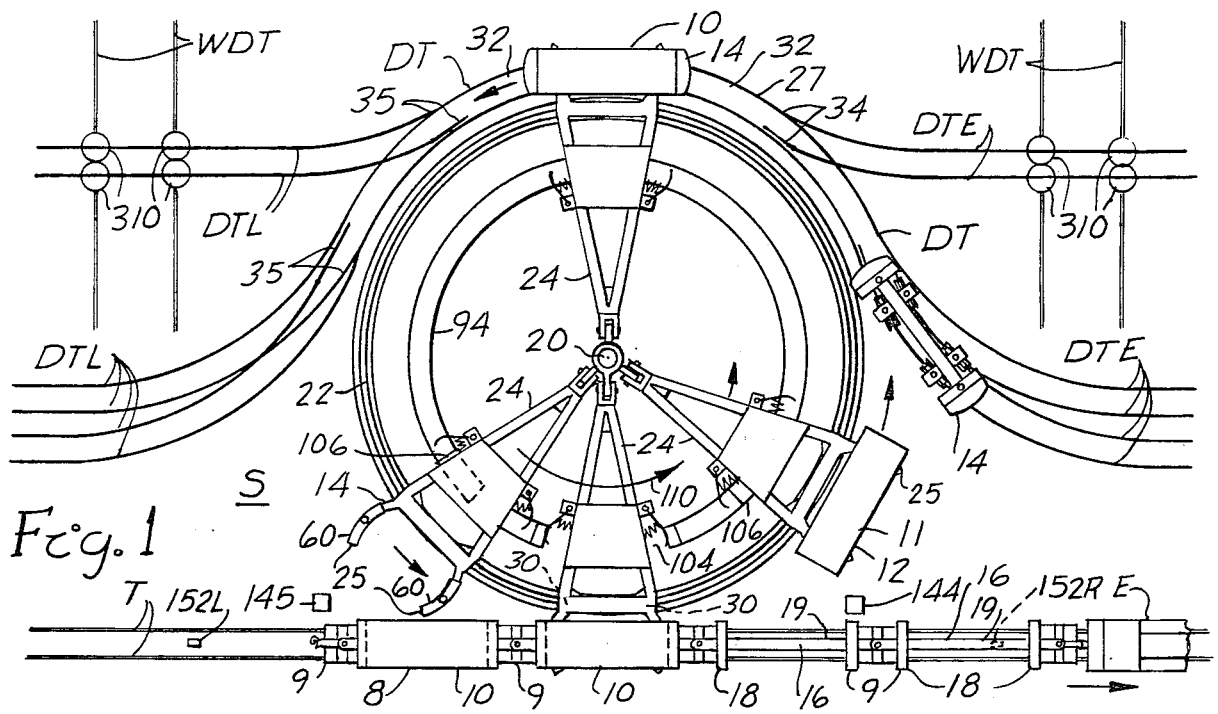
Fig. 1
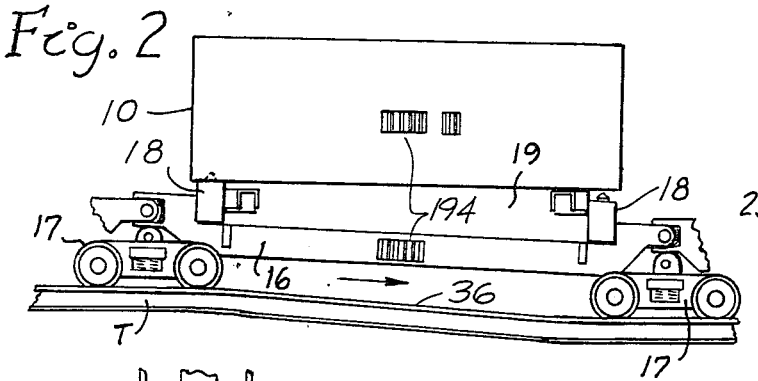
Fig. 2
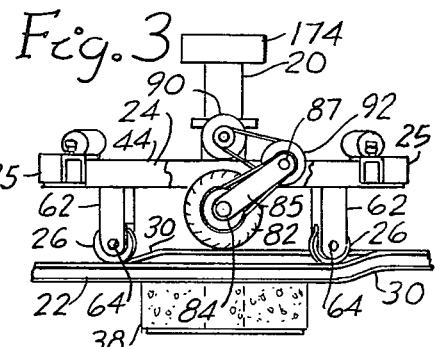
Fig. 3
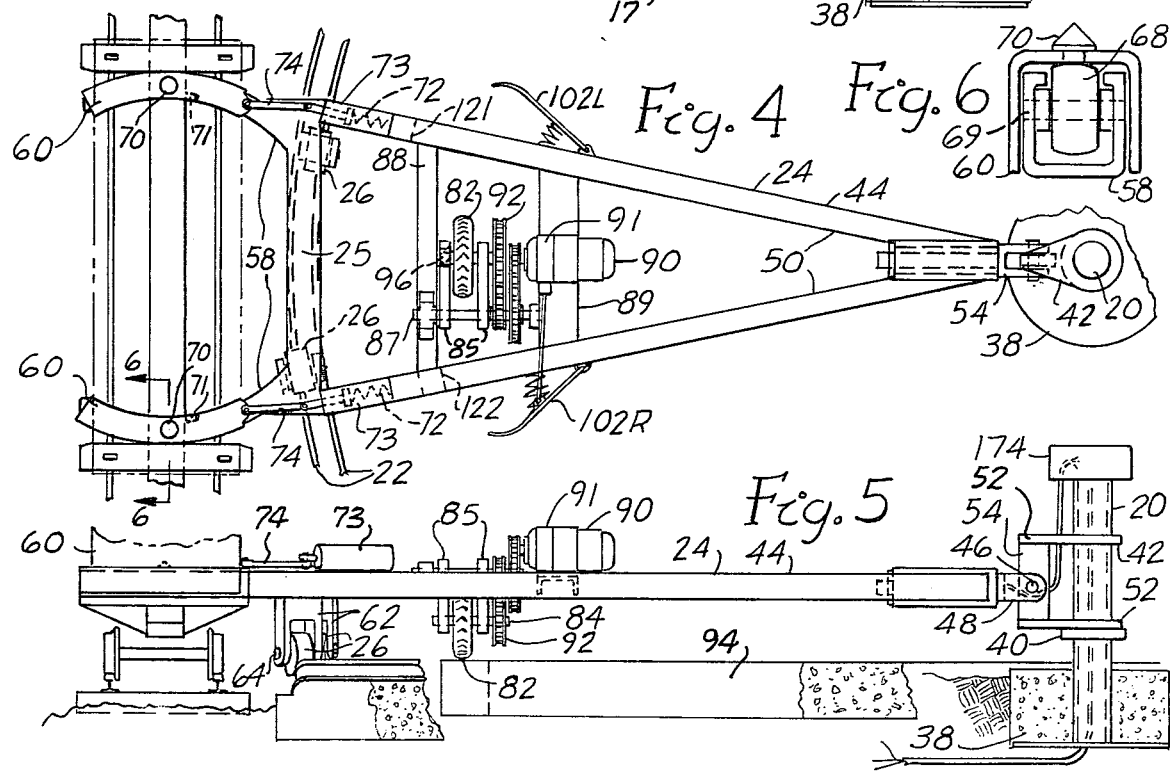
Fig. 4
Fig. 5
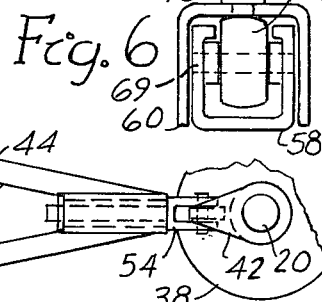
Fig. 6

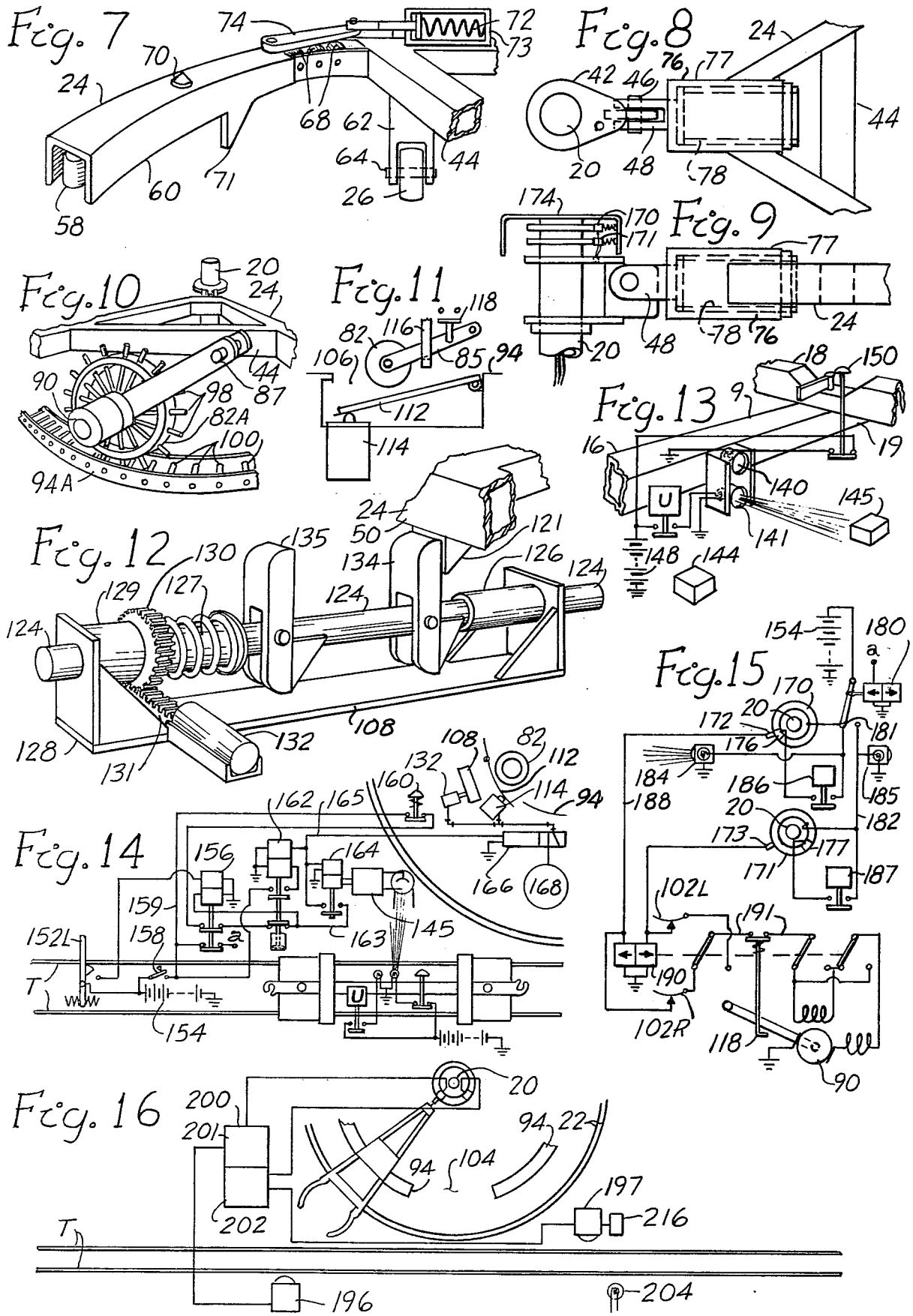

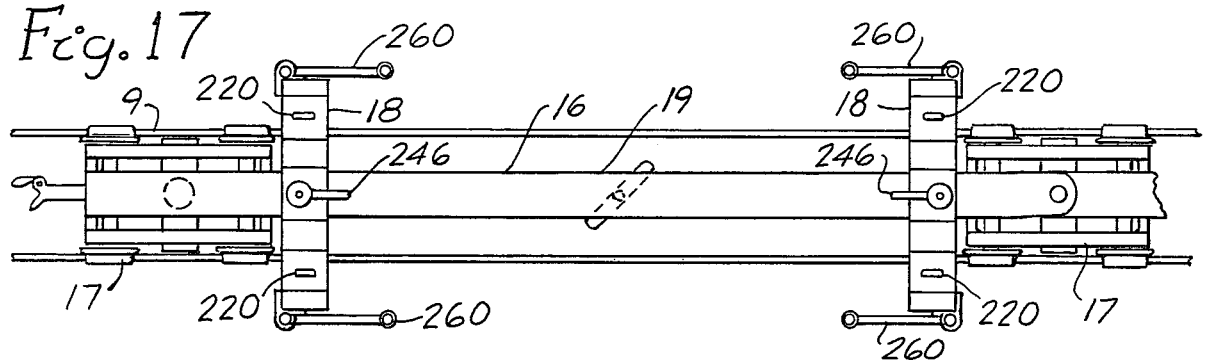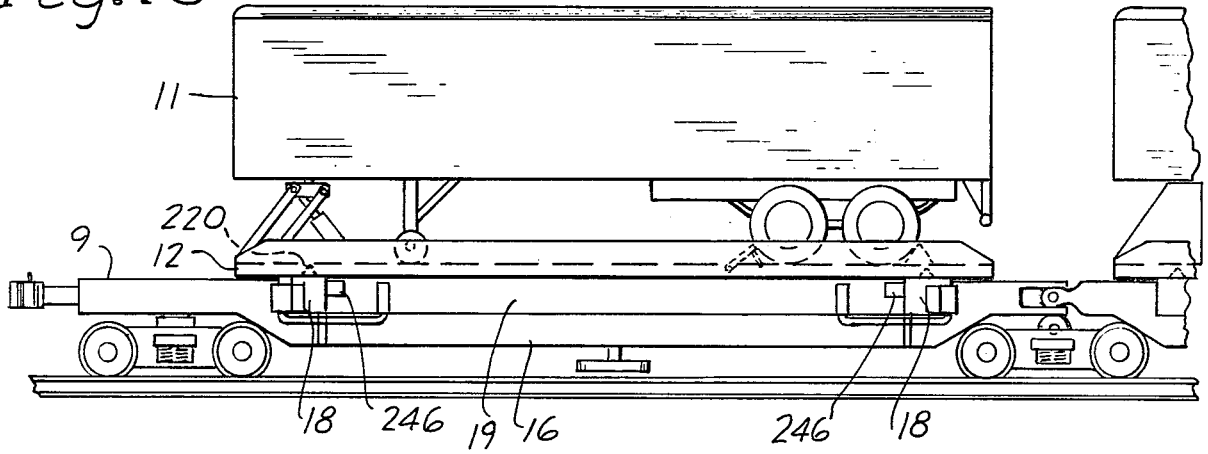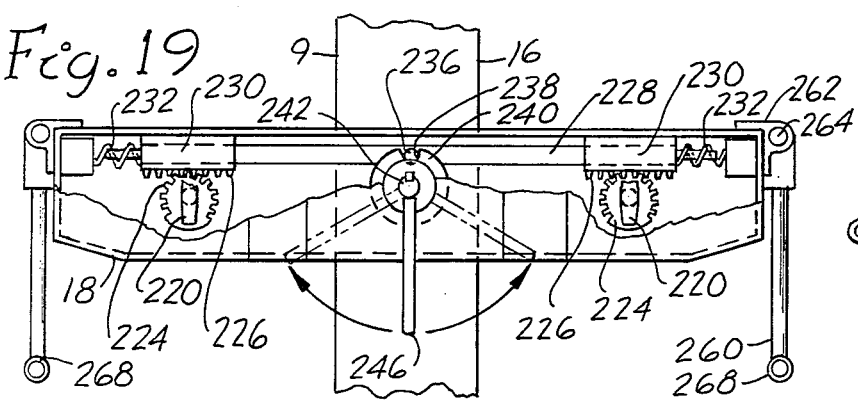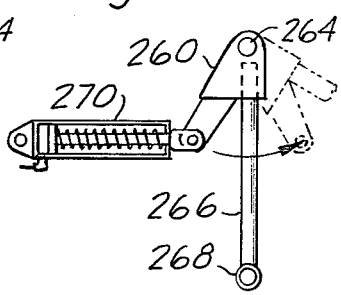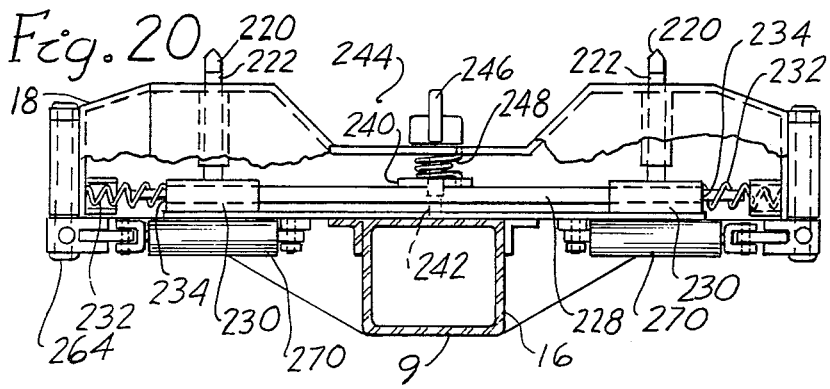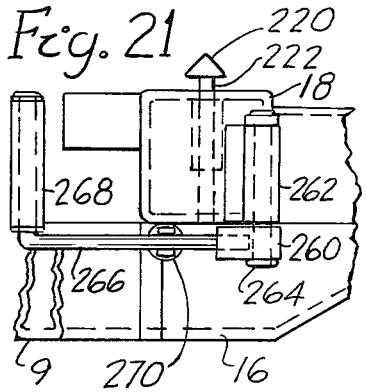

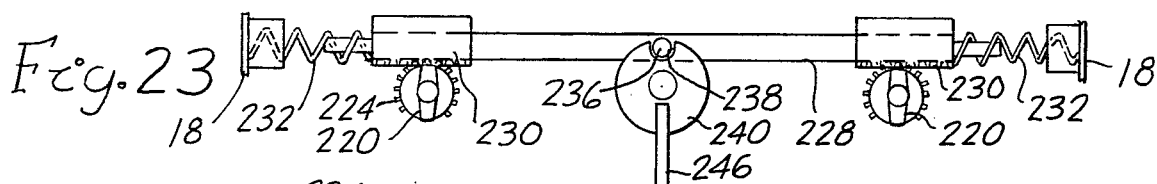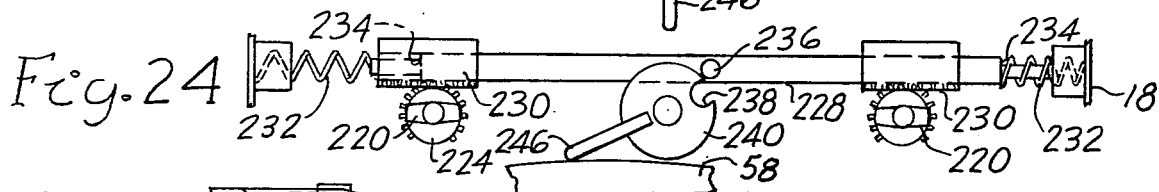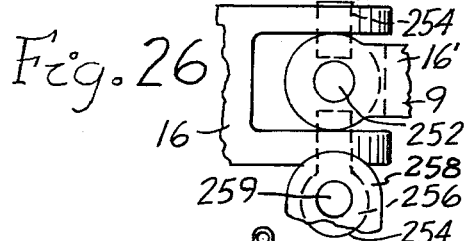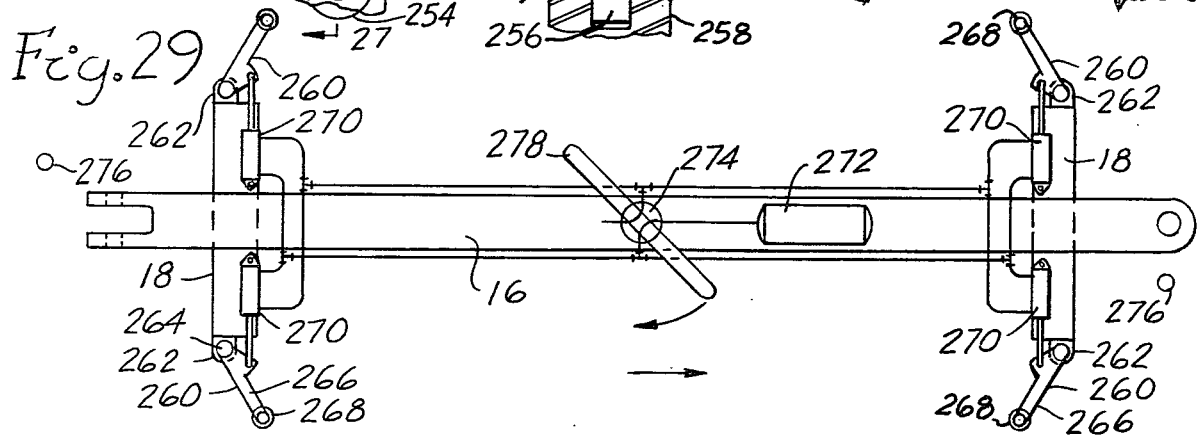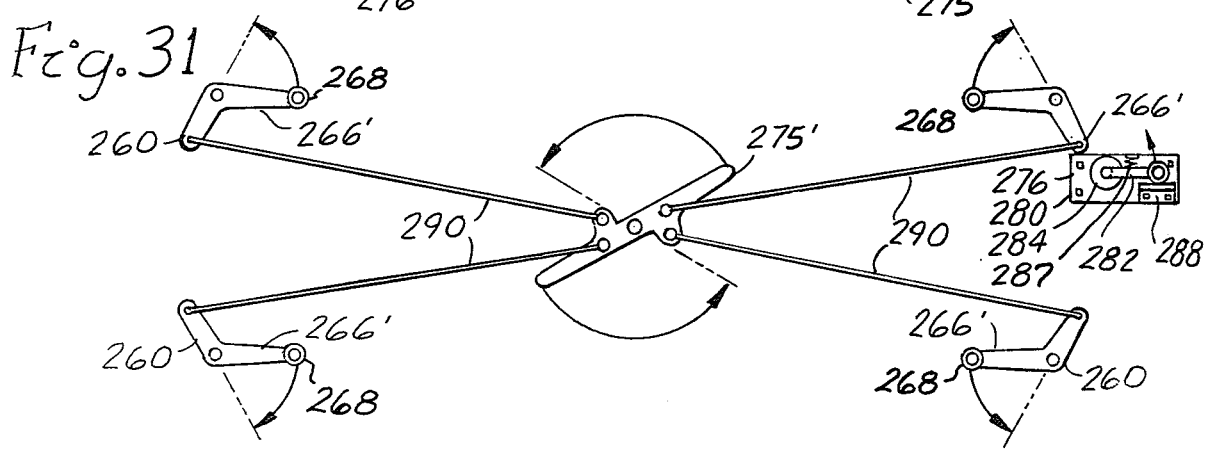

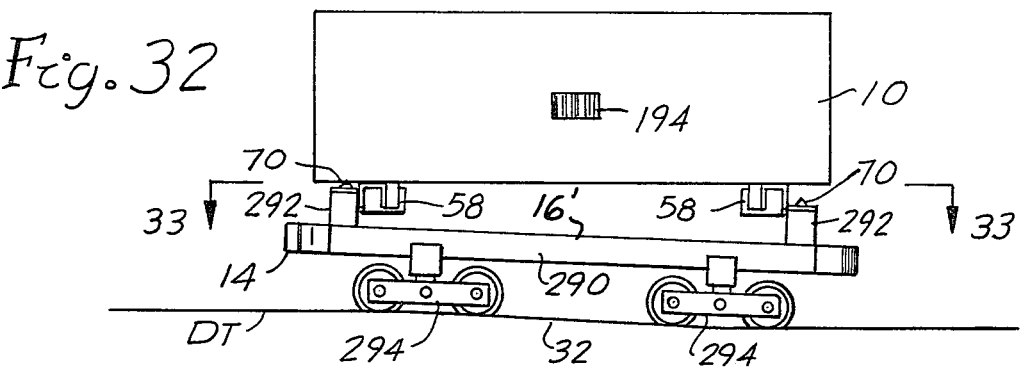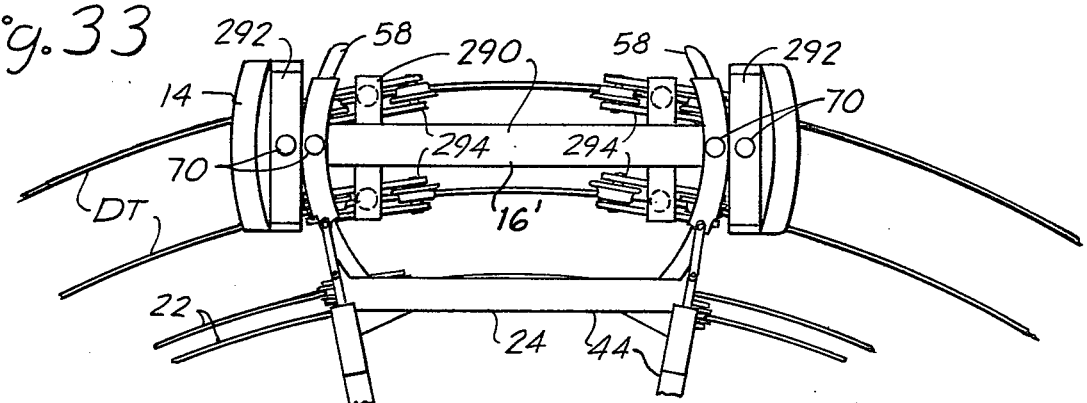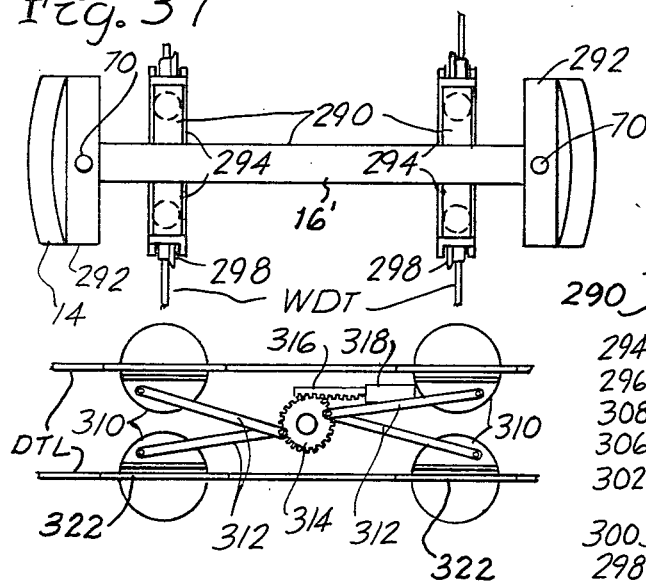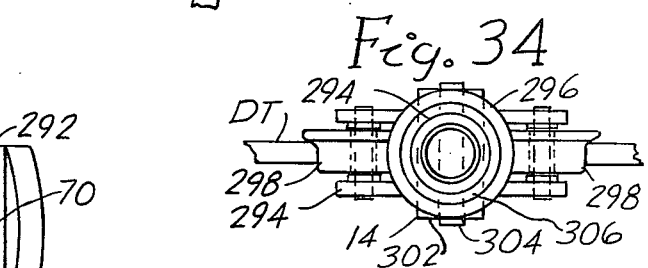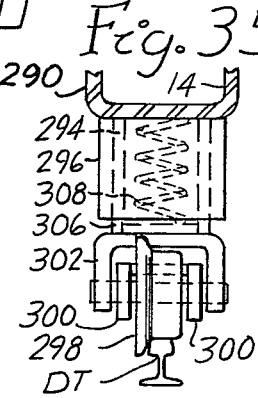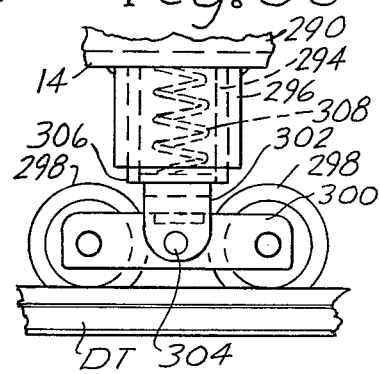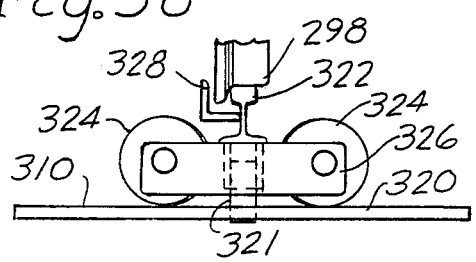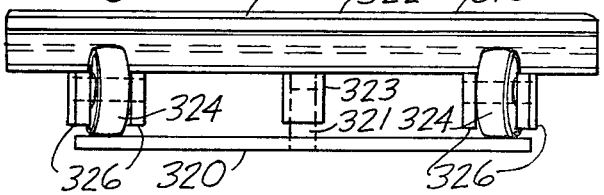

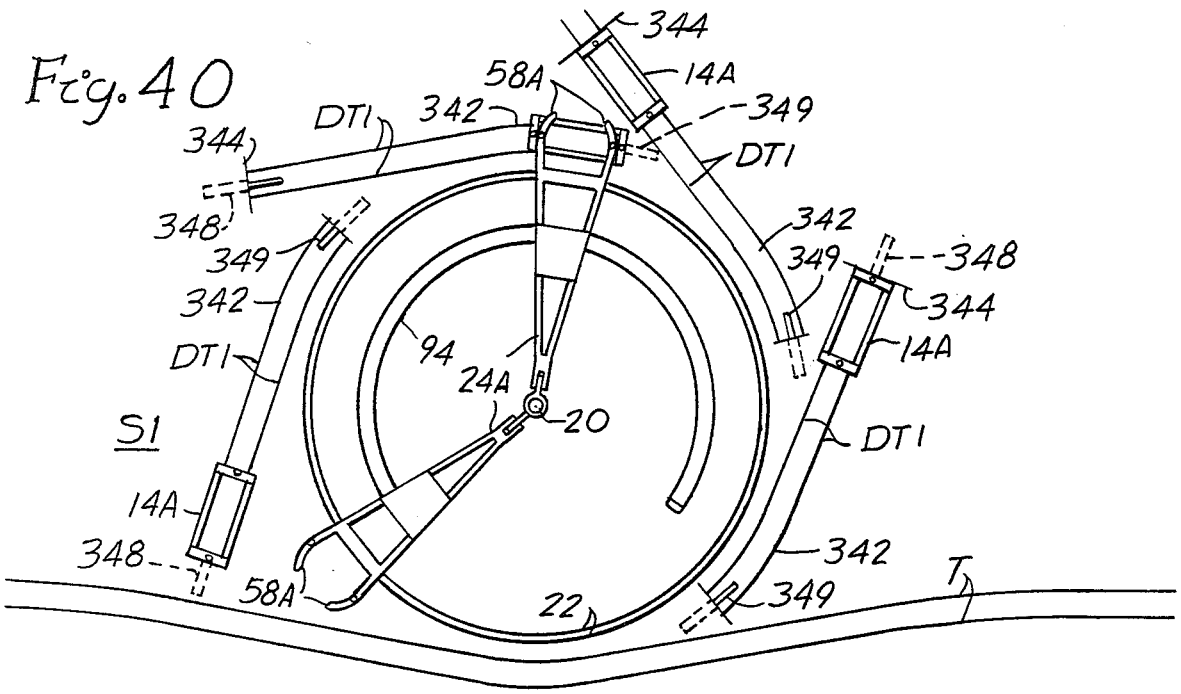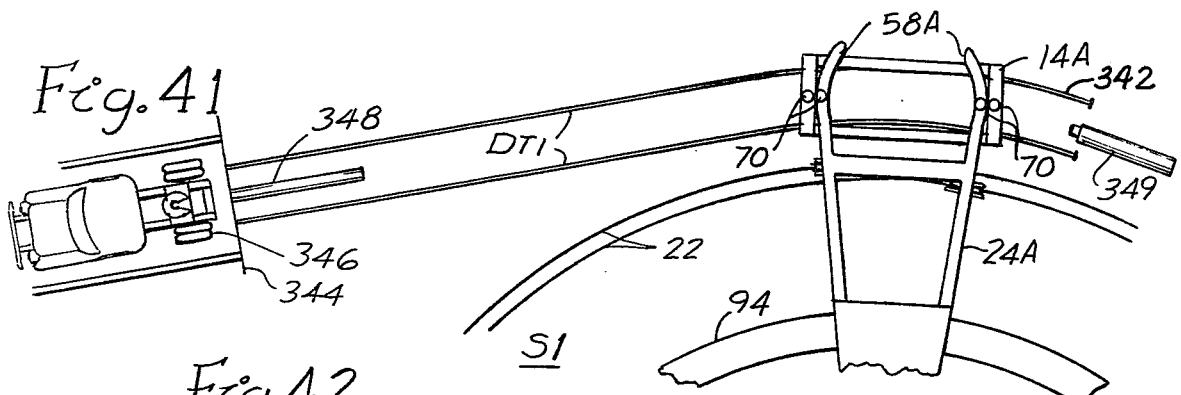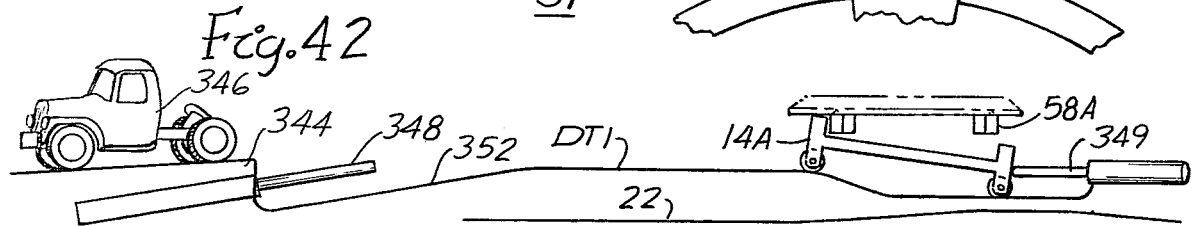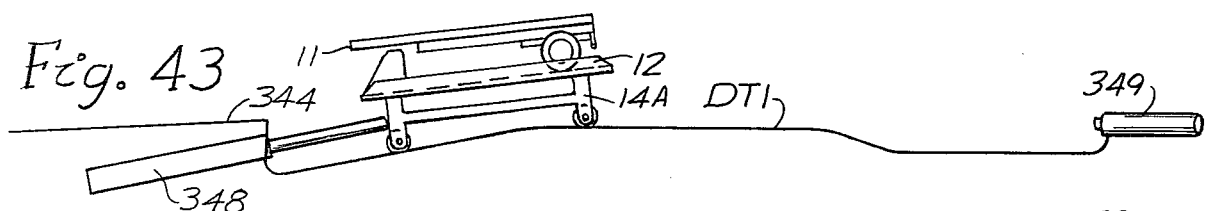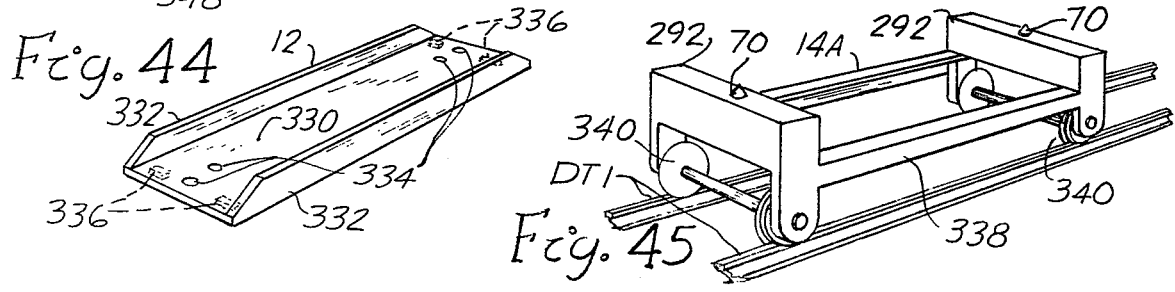

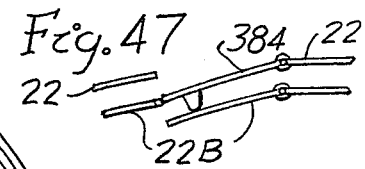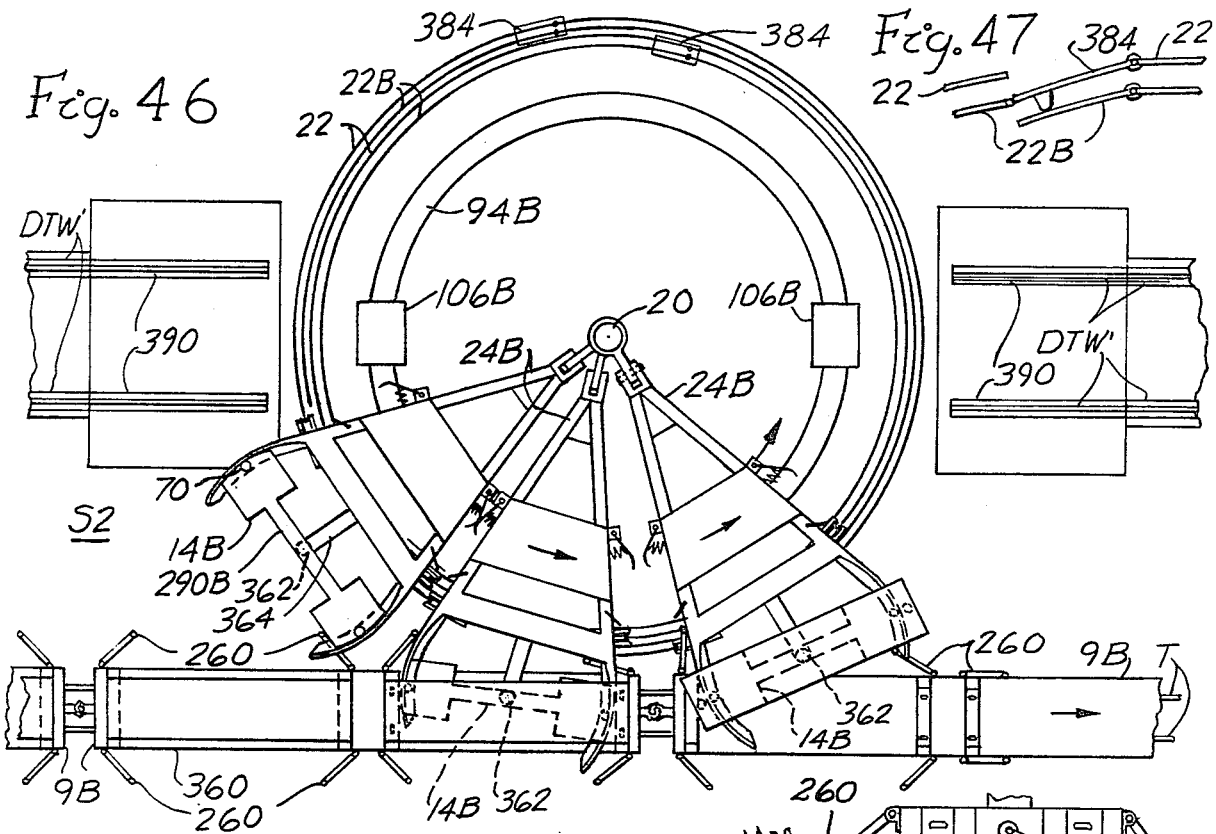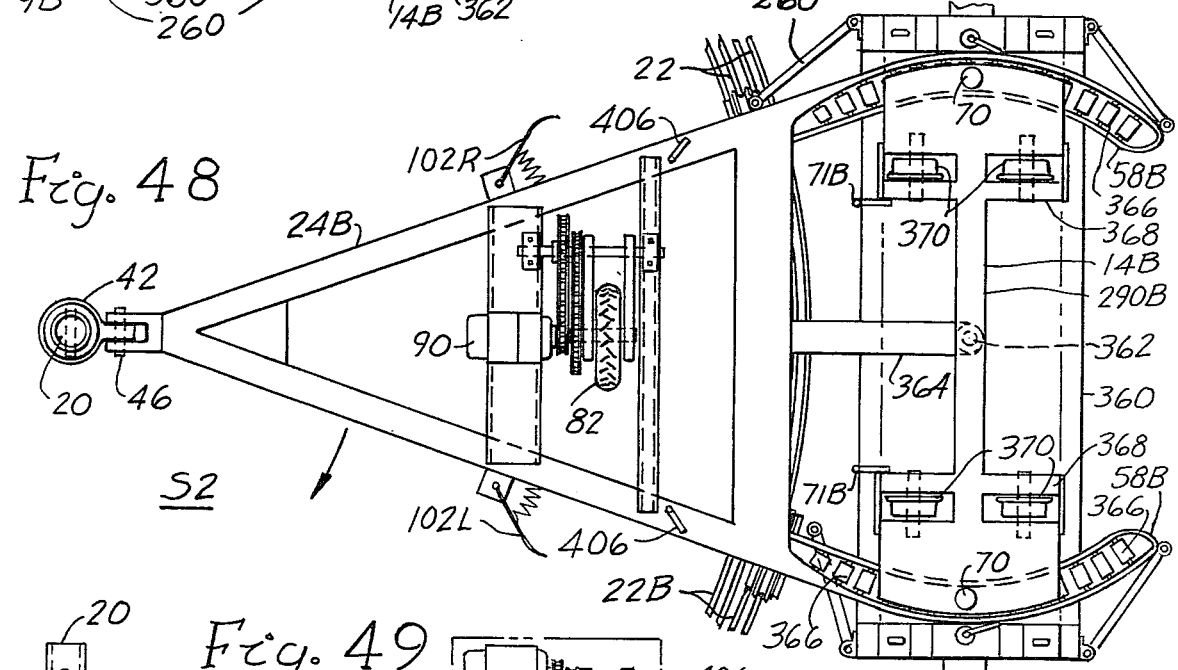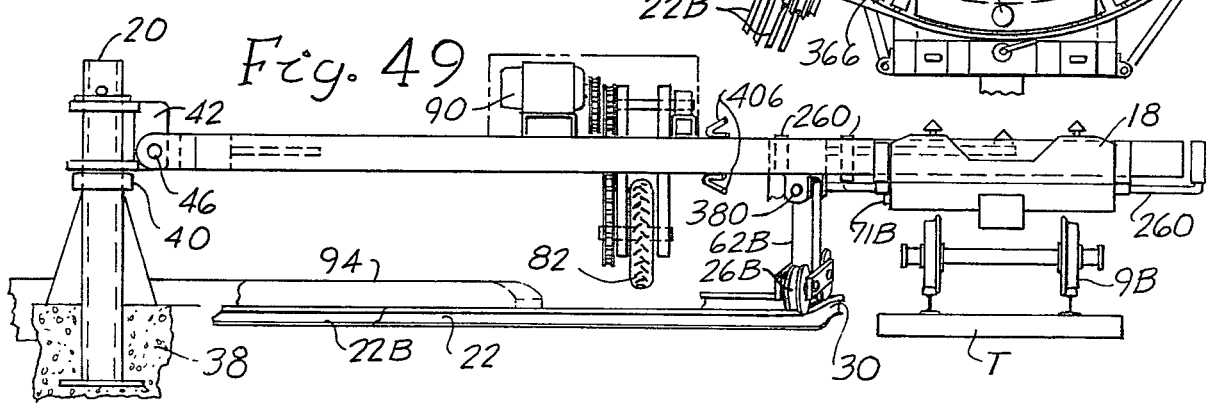

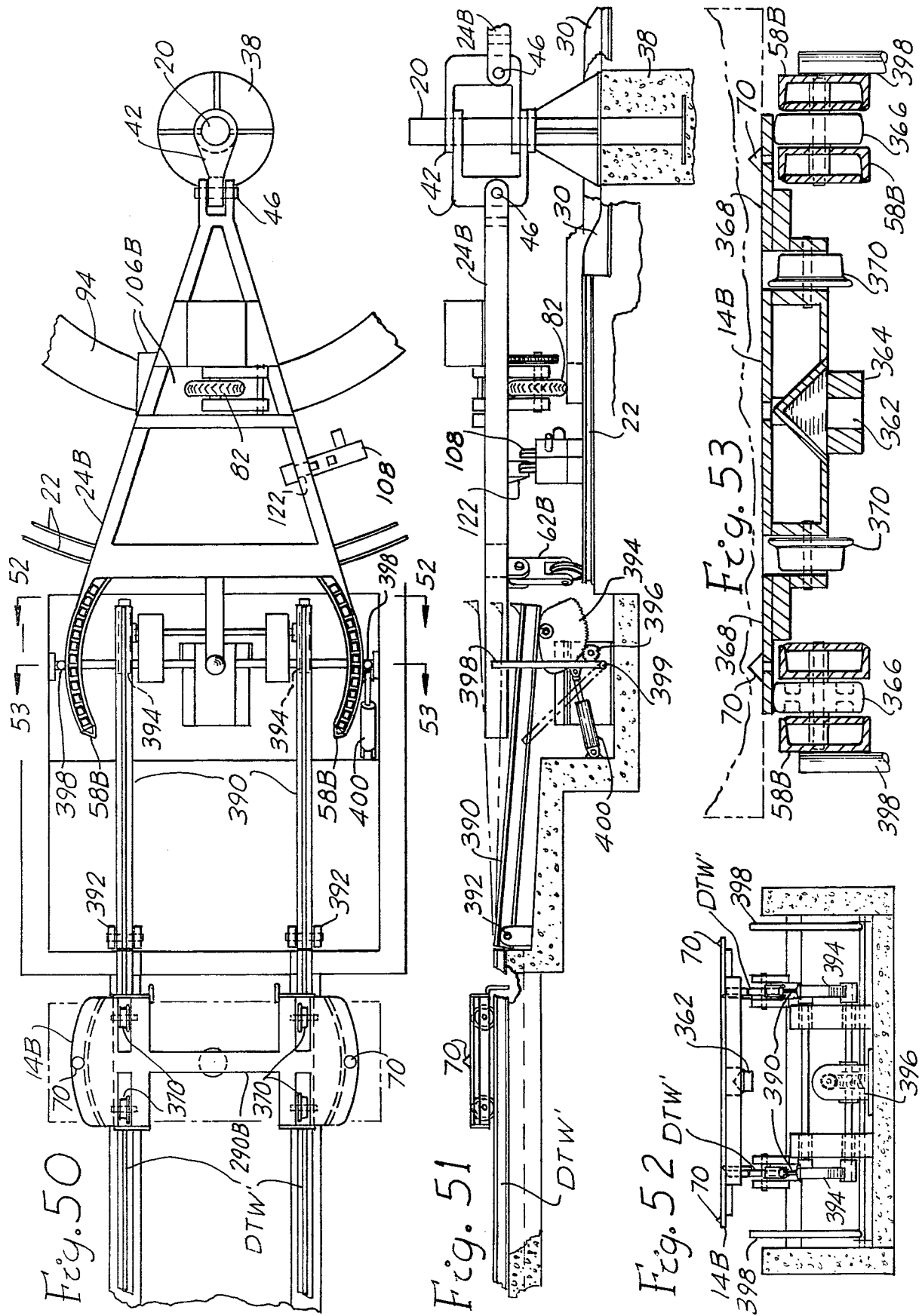

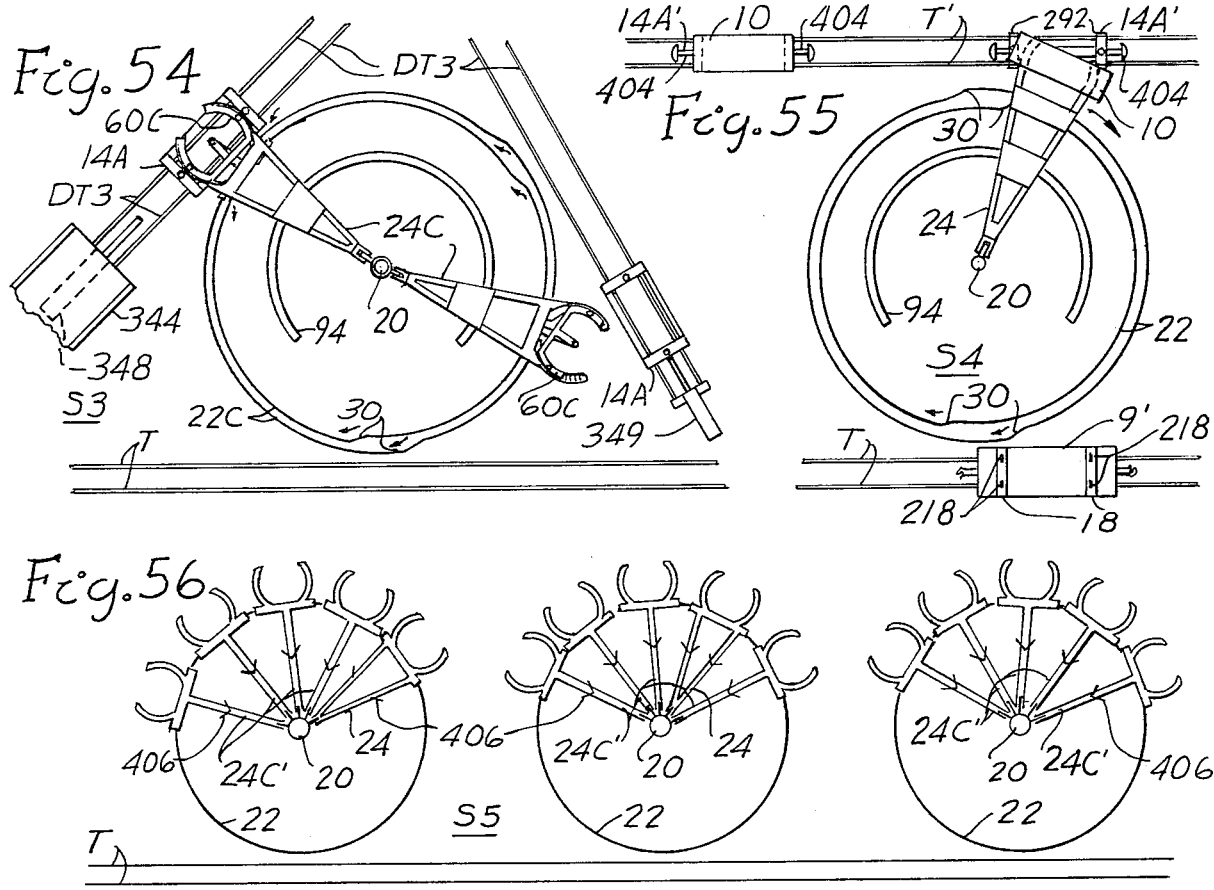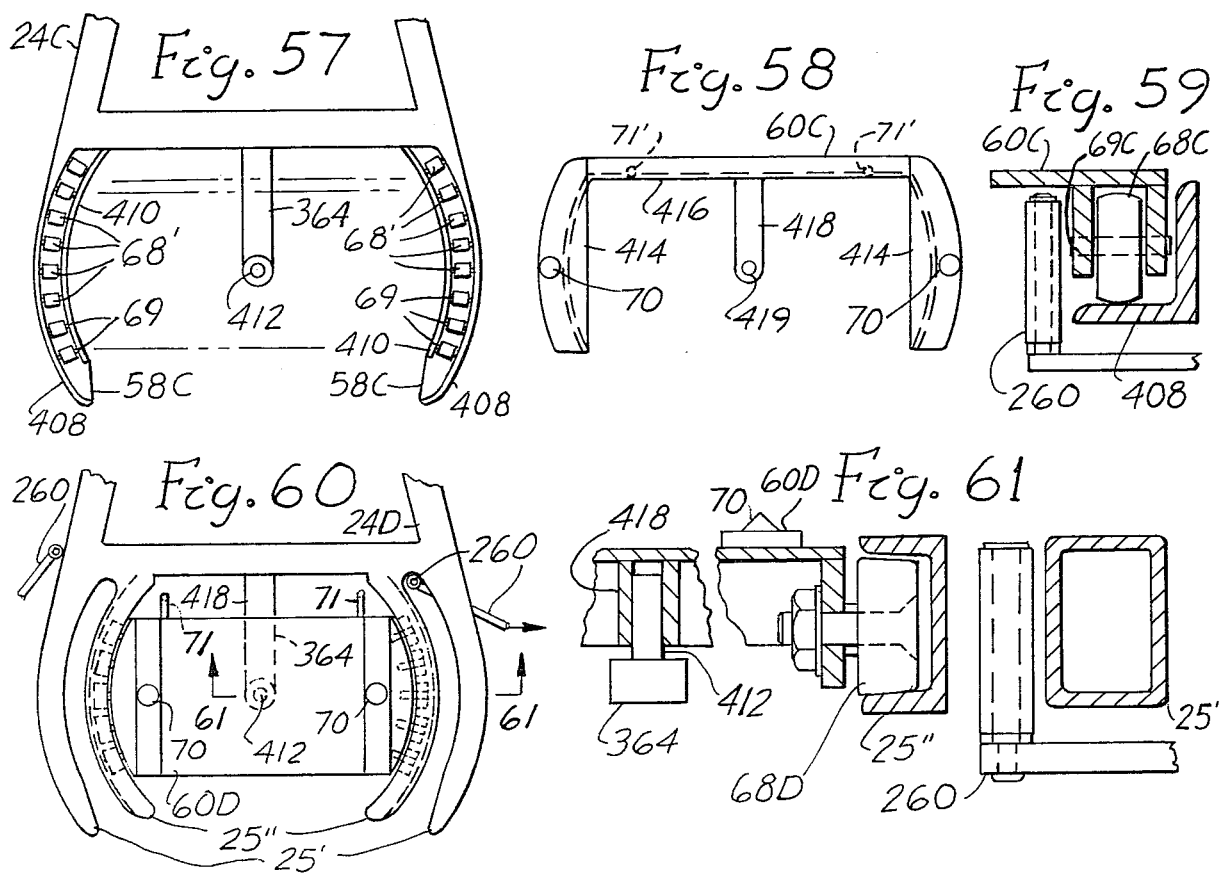

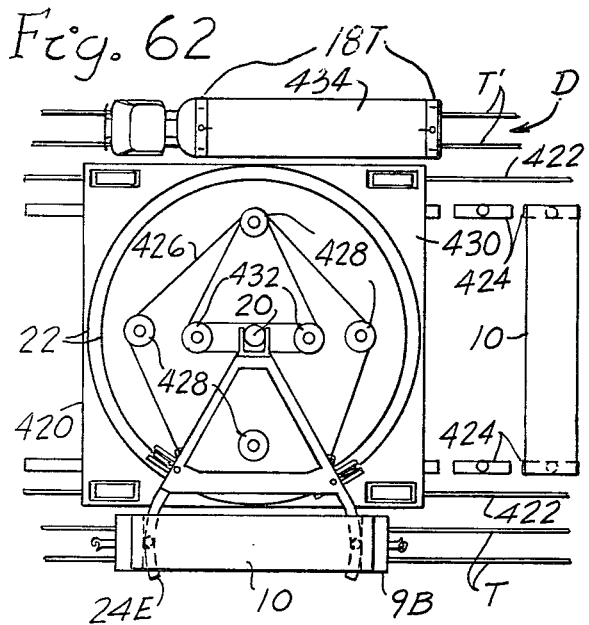
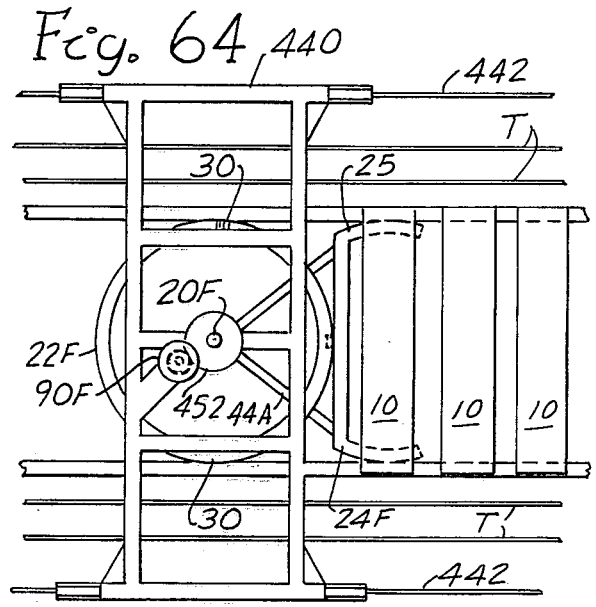
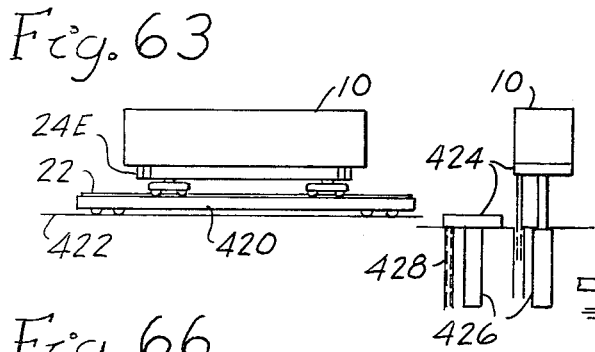
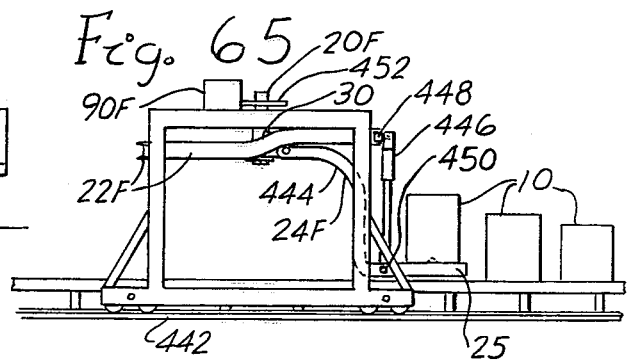
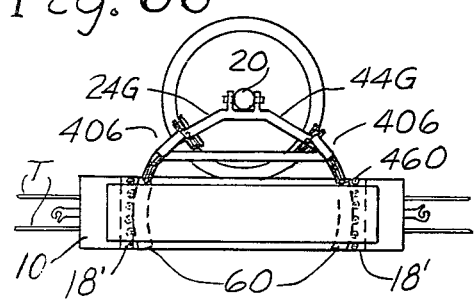
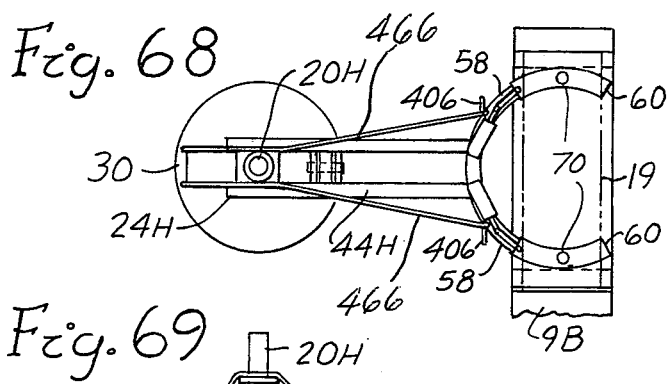
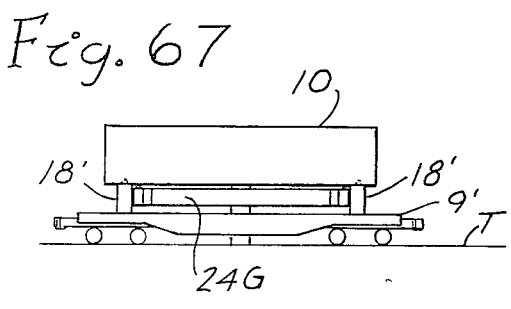
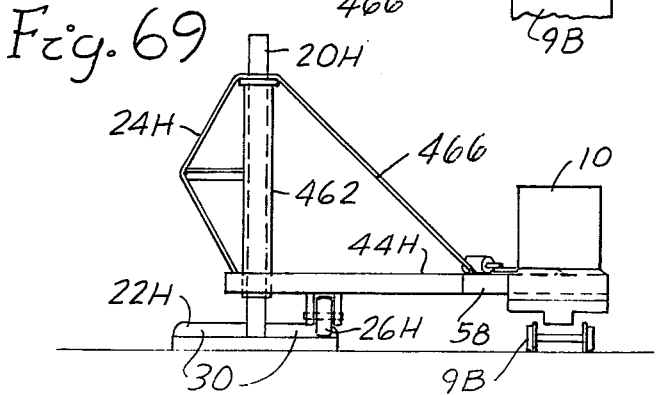

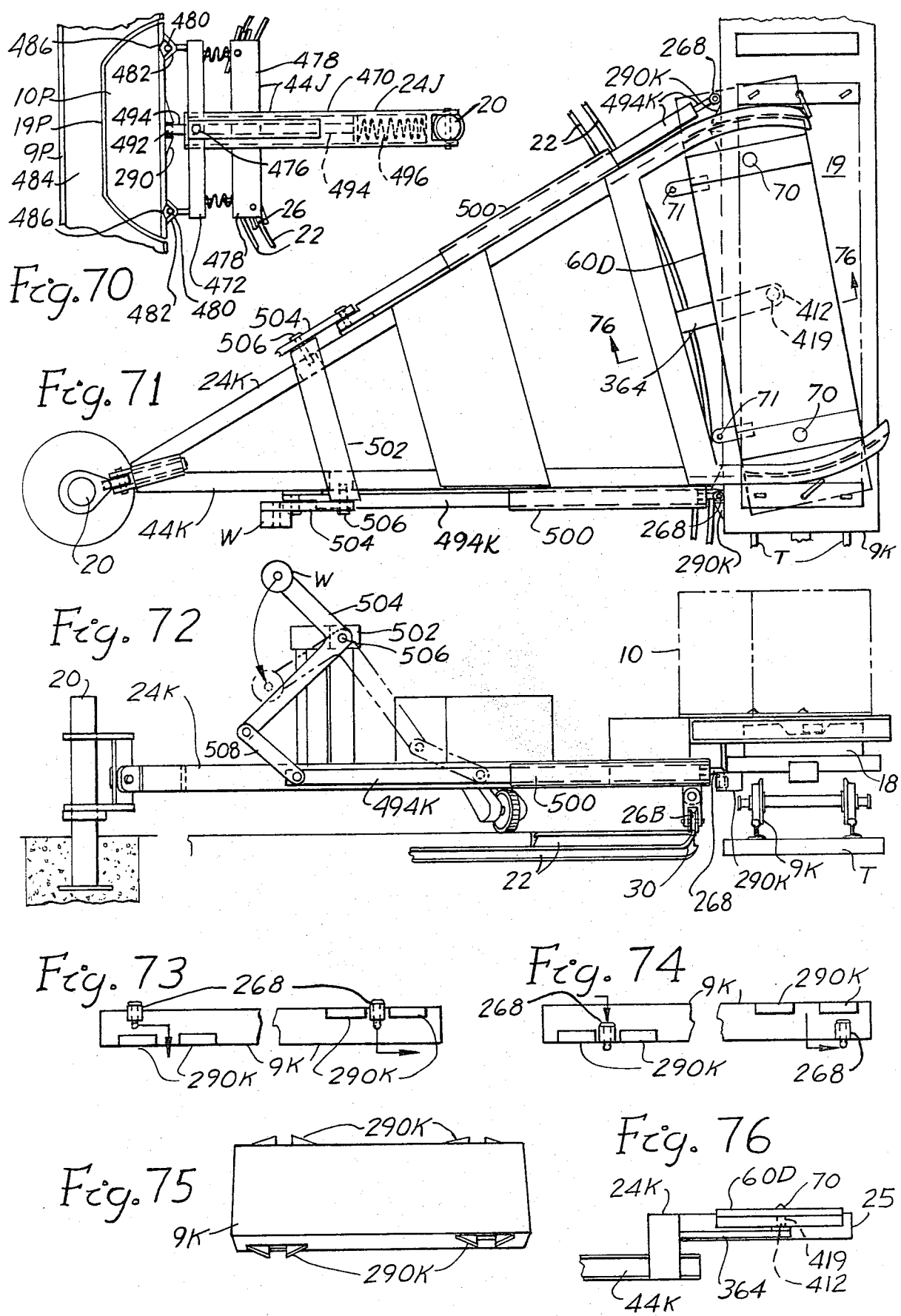

ROTARY LOADER AND STORAGE SYSTEM

CROSS REFERENCE TO RELATED APPLICATIONS

This application is related to my U.S. Pat. No. 4,124,129, issued Nov. 7, 1978, and to lesser extent to several of my earlier applications and patents.

Objects of this invention are to provide a comprehensive container and trailer handling system for improving the competitive position of the railways; to provide an improved load handling and storage system especially for transfer of containers or trailers to or from successive berths on railway cars moving past the loader; to provide a loader of simple, rugged, and low cost design which eliminates load bearing joints of my parallelogram type loader; to provide a radial loader for revolving about a single pivot past; to enable a plurality of loader frames about one pivot post; to provide a loader which can be engaged to transfer containers or pallets selectively from railway cars or truck beds to storage dollies nonstop, to provide a loader system having a plurality of load frames to revolve about the pivot to continuously load or unload to transfer all the containers of a size for that station off or onto a train without need to stop the train or to uncouple or switch cars, to enable nonstop unit train operation for general freight and passengers; to provide a classification yard for containers or trailers that eliminates need to sort railway cars; to provide a loader which has large coupling tolerance that can be self-propelled and controlled to engage a railway car moving by, to eliminate side couplers from the railway car or to provide car to loader coupling to gradually accelerate the loader and in either case to reduce engagement shock and peak force needed to start the loader; to provide a loader well suited for handling short containers and especially for operation with the four-wheel European-type railway cars; to provide economical storage systems to function with the loader including dolly systems and pallets for handling vehicles; to provide simple railway pedestal cars with automatic locking devices for containers and pallets and articulated cars for operation with the loader to reduce the height and wind resistance and cost of the train; to increase and extend the utility of the loader; to cut cost of the loading and unloading operation and equipment and enable both high and low volume automatic loading facilities to be practical; and to provide a loader adaptable to material handling, to amusement devices, and to working miniature sizes as models and toys.

These, other, and further objects and features are attainable with this invention and should be obvious from study of this specification by those skilled in the related arts or will be pointed out herein with reference to the drawings wherein:

FIG. 1 is a plan view of a train to dolly transfer and storage station with the loaders unloading a train moving left to right past the loaders.

FIG. 2 is a side view of an articulated car unit in the train being unloaded by a loader of FIG. 1.

FIGS. 3, 4, and 5 are respectively front, plan, and side views of a loader of FIG. 1 to scale of FIG. 2.

FIG. 6 is a sectional view of a loader's arm taken on line 6—6 of FIG. 4.

FIG. 7 is a perspective view of an arm and support wheel of a loader.

FIGS. 8 and 9 are partial plan and side views of the pivot end of a loader on its post.

FIG. 10 is a partial perspective of a loader with a toothed drive.

FIG. 11 is a side schematic of a drop section in the loader's driveway with a loader's drive wheel disengaged thereover.

FIG. 12 is a perspective of a stop engaged by a latch block on a loader.

FIG. 13 is a schematic perspective of signal lamps on the side of the sill of a pedestal car and a trackway photoelectric receiver.

FIGS. 14, 15, and 16 are schematics of various controls for the loader.

FIGS. 17 and 18 are plan and side views of an articulated railway pedestal car end unit with a semitrailer on a pallet added in FIG. 18.

FIGS. 19, 20, and 21 are plan, side, and end views of a railway car pedestal with side couplers.

FIG. 22 is a plan of a side coupler and actuating cylinder.

FIGS. 23 and 24 are schematic plan views of the hold down devices for the pedestal in respectively closed and open positions.

FIGS. 25 and 26 are plan and side views of a car swivel joint.

FIG. 27 is a section on line 27—27 of FIG. 26.

FIG. 28 is a perspective of a trackway control for the side couplers.

FIG. 29 is a bottom view of a car sill showing side coupling controls schematically.

FIG. 30 is a track and operating schematic for the side couplers.

FIG. 31 is a schematic of a variation of the side coupler control.

FIGS. 32 and 33 are to a larger scale side and plan views of a dolly at the station with end of a loader for moving the dolly to the left to set a container thereon.

FIGS. 34, 35, and 36 are plan, end, and side views of a dolly wheel unit to larger scale.

FIG. 37 is a plan view of a dolly on storage track connected by a four-turntable switch to scale of FIGS. 32-33.

FIGS. 38 and 39 are end and side views of a dolly-wheel turntable to larger scale.

FIG. 40 is an alternative station plan specially for vehicle pallets.

FIGS. 41 and 42 are plan and side views of a loader to dolly to truck transfer run at the station FIG. 40.

FIG. 43 is a side view of FIG. 42 after the loader has left a pallet with trailer on a dolly and the dolly is being lowered to align the pallet against the truck ramp.

FIGS. 44 and 45 are perspective views of the pallet and dolly respectively.

FIG. 46 is a plan view of another loader station with dolly handling loaders.

FIG. 47 is a plan view of a switch in a loader track.

FIGS. 48 and 49 are plan and side views of a loader at the station of FIG. 46 engaged over a railway car to larger scale.

FIGS. 50 and 51 are plan and side views of a loader of FIG. 46 at a dolly track transfer to larger scale.

FIGS. 52 and 53 are sections respectively on lines 52—52 and 53—53 of FIG. 50, FIG. 53 being enlarged but not to scale with dolly added.

FIGS. 54, 55, and 56 are some other station plans for the loaders.

FIG. 57 is a plan view of a variation of the loader's fork.

FIG. 58 is a plan view of a cradle for the fork of FIG. 57.

FIG. 59 is a sectional view of a variation of the fork arm with end of a cradle thereon and side coupler relatively spaced.

FIG. 60 is a plan view of a compound fork on a loader.

FIG. 61 is an enlarged section on line 61—61 of FIG. 60.

FIGS. 62 and 63 are plan and front elevation views of a station having a rotary loader on a traveling platform between vehicle ways and transferring a container from a railway car to a truck bed, FIG. 63 omitting the railway car.

FIGS. 64 and 65 are plan and front views of a rotary loader gantry engaging under a container and straddling a transverse storage row between two railroad tracks.

FIGS. 66 and 67 are plan and front views of a short loader transferring a container to or from a vehicle.

FIGS. 68 and 69 are plan and side views of a jib mounted loader transferring a container over a vehicle.

FIG. 70 is a plan view of a rotary loader, having a telescoping coupling, engaging a passenger container in a railway car.

FIGS. 71 and 72 are plan and side views of a variation of the loader engaging a railway car with two telescoping couplers.

FIGS. 73 and 74 are successive side views of a vehicle frame engaged by side couplers on the loader of FIGS. 71-72.

FIG. 75 is a perspective plan of the vehicle bed to show side coupling latches on both sides.

FIG. 76 is a section on line 76—76 of FIG. 71

Referring to the drawings and in particular to FIGS. 1-5, train 8 with engine E and one or more pedestal cars 9 on track T can slowly pass container or trailer transfer and storage station S and unload containers 10 and semitrailers 11 on pallets 12 to storage dollies 14 on track DT or load in the reverse direction. Cars 9 include a sill 16 on trucks 17 with transverse pedestals 18 defining a load berth 19 for the container or pallet. Station S has a rotary loader including a vertical post or column 20, two-rail circular cam track 22 concentric therewith, and one or more loaders or loader arms or frame units 24 each with an outfacing curved load support or fork 25 supported on wheels 26 on track 22 to revolve around pivot 20 and engage fork 25 between ledges or pedestals 18 for transfer of the load.

Track T runs straight by station S but can be curved. Track DT is curved out on arc 27 past the loader track to a radius from pivot 20 for dolly movement but can be straight. Each rail of track 22 has a short slope 30 down from right to left in FIGS. 1 and 3, spaced apart to support each end of the loader to lift and lower equally in a short distance where closest to track T. Track DT has a slope 32 up from right to left between switches 34 and 35 to opposite dolly storage tracks DTE and DTL for respectively empty and loaded dollies. Track DT is curved around arc 27 to include switches 34 and 35 to the various dolly sorting tracks so the loaders can move empty dollies from storage tracks DTE at the right up slope 32 to load them and move them on into sorting tracks DTL at the left. Track T optionally has a slope 36 down from left to right in FIG. 2 to increase the effect of slopes 30.

Referring to FIGS. 4 and 5, post 20 is embedded in a concrete base 38 and is circular above a ledge or collar 40 for supporting one end of the loaders each on a collar bracket 42. Each loader 24 has a frame 44 preferably in plan an isoseles triangle pivotally secured on pin 46 through clevis 48 at the juncture of its equal sides 50 to swing up and down on a bracket 42 and revolve about post 20 at a fixed height. Each bracket 42 has two collars 52 connected by plate 54 in a radial plane outward from post 20 so several loaders can revolve separately on post 20 at the fixed height. Each frame 44 has a load fork 25 including two end arms 58 curved on an arc about the center of the load to be carried therebetween on telescoping ends or alignment cradles 60. The arms extend starting substantially radial from outer ends of the sides for the frame. A leg 62 extends down from each outer angle of the frame to a wheel 26 to support each end of the fork on a rail of track 22. Each wheel 26 is mounted on an axle 64 radial from pivot 20. Wheels 26 are wide rollers or drums to remain on their rail of track 22 if the rail is not accurately concentric about pivot 20.

Referring to FIGS. 6 and 7, each arm 58 is in section a deep channel with legs up and rollers 68 therebetween on axles 69 radial from the load center centered between the arms. Each cradle 60 is a deep channel which is curved closely to and covers over the sides of the arm which supports it on rollers 68. Cradle 60 has a central locating cone 70 on top and a locating finger 71 on the inside extending down to engage a car 12 to align for transfer. Cradle 60 is extended to the outer end of its supporting arm by coil spring 72 in an open vented cylinder 73 whose rod end is connected by link 74 to the rear of the cradle to let the cradle move in on arms 58 when finger 71 is engaged with a car to align the cradle for transfer.

The frame of loader 24 can be secured rigidly to clevis 48 but is preferably mounted by a swivel 76 to clevis 48, FIGS. 8 and 9, to tilt from side to side. Then both wheels 26 can run on one cam track rail which would tilt the loader without twisting it on transfer slopes. The outer sleeve 77 of swivel 76 is secured radially on an axis bisecting the angle between the converging sides of frame 44. Clevis 48 is secured on an end of sleeve 78 of swivel 76 which is slip fit and held to turn in sleeve 77.

Each loader 24 is separately driven by a wheel 82, FIGS. 3, 4, and 5, supported on drive axle 84 between parallel arms 85 mounted to swing up and down on shaft 87 bearing mounted between frame cross members 88 and 89 and driven by gearmotor 90 through clutch 91 and chain and sprocket drive 92. Wheel 82 has a rubber tire to engage a paved drive 94 concentric about post 20. Springs between arms 85 and frame 44 increase traction. Gearmotor 90 can be directly mounted on shaft 84 as shown in FIG. 10 to simplify and increase traction. Optionally a wheel 82A with protruding spokes or teeth 98, FIG. 10, can drive the loader around a drive track 94A of radial rungs 100 in place of wheel 82 and driveway 94 to increase the drive force especially when in snow and ice. A spring lever switch bumper 102L or 102R, FIG. 4, on a cushioning extension from respectively the left and right sides of the loader shuts off the drive motor and preferably declutches it and applies brakes on a loader which runs into another loader. This enables the loaders to wait against each other for their turn to couple a train. Driveway 94 or 94A can be omitted from area 104, FIGS. 1 and 16, where the loader fork is captured between pedestals so the loader will not buck the train, but the driveway can be included there to aid or provide movement of the train or car.

The loaders are stopped to wait for a train in either direction by a drive wheel drop 106 and a latch stop 108 ahead of and defining a transfer run 110 for each direction. Each wheel drop 106, FIG. 11, has a plate 112, section of driveway 94, hinged at one end to swing down into pit 106 and is swung up by air cylinder 114 connected between plate 112 and a bracket in pit 106. When a wheel 82 runs into a dropped section it is supported on bar 116 from dropping very far so that it is disengaged from the driveway and opens switch 118 to shut off power to motor 90. The loader coasts against a spring cushioned latch stop 108, FIG. 12, to more accurately position it. Frame 44 has tapered latch blocks 121 and 122 secured to the bottom of respectively the left and right sides each at a different distance from pivot 20 to engage respectively only the stop 108 at the left or right end of the transfer run 110.

Each stop 108, FIG. 12, has a shaft 124 which slides in sleeves 126 and 127 on opposite ends of base 128. Shaft 124 is keyed to rotate with sleeves 127 which slides in a sleeve 129. Sleeve 127 has a spur gear 130 secured concentric therewith engaged with rack 131 on rod of cylinder 132 which rotates shaft 124 about 90°. Shaft 124 has two stop latches 134 and 135 which pass the latch block of a loader moving away from track T but stops a loader moving toward track T until cylinder 132 rotates the latches 134 and 135 out from the block. Cylinders 132 are controlled to start the first loader waiting. The following loaders then move up so the next is stopped at the stop to wait for the next transfer.

The loaders have an engagement tolerance of over 20 feet for a 40 foot berth depending on train speed relative to loader acceleration. This is ample for manual control of the loader to safely engage a slowly moving car. Therefore cylinders 132 can be manually controlled to start the loaders but preferably are automatically controlled as from lamps on the cars or by a computer.

Referring to FIGS. 13 and 14, two lamps 140 over 141 on the side of the car sill 16 central of each load berth 19 are directed out to shine on respectively photoelectric cells 144 and 145, at respectively the train loading end and the unloading end of transfer run 110 for respectively signaling for unloading the berth or that the berth is empty and available for loading. Relay U, controlled as in FIG. 21 of my U.S. Pat. No. 3,483,829 closes a circuit through lamp 140 across battery 148 on car 9. Limit switch 150 detects an empty berth to close a circuit through lamp 140 across battery 148. Limit switch 152L at the left and 152R at the right of station, FIG. 1, each have a rod extending up vertical between rails of track T, FIG. 14, to be tilted by the axles of the cars to close a circuit for a train approaching from the left or right respectively. When a train approaches from the left, FIG. 14, a circuit is closed from the positive of battery 154, normally open contacts on limit switch 152L to be closed by a train from the left, top coil of stick relay 156 to ground of battery 154. Relay 156 lifts to close circuits from the positive of battery 154, reset switch 158, line 159, normally closed limit switch 160 opened by the loader passing stop 108, front contacts of stick relay 156, back contacts of time delay relay 162, line 163, lower holding coil of relay 156 in series to ground, and from line 163, front contacts of a stick relay 164, line 165, top coils of time delay relay 162 and relay 164 in parallel to ground, and from line 165 solenoid of valve 166 to ground connecting air from reservoir 168 to head ends of cylinders 132 and 114 to release stop 108 and lift plate 94 to start the loader to accelerate. After wheel 82 passes the pit the loader contacts switch 160 opening these circuits to set the stop for the next loader. The loader turns counterclockwise moving its forward form arm 58 against the forward pedestal of the berth and moves therewith bringing the rear arm 58 between the pedestals 18 which locates the loader accurately when fully extended over the car for transfer. If the loader does not start or start soon enough the timer 162 closes top contacts which connect its lower coil in series with switch 158 across battery 154 to quickly operate the timer to open its normally closed contacts to open the circuit to valve 166 to stop the loader by the raising of stop 108 which catches the slow loader on the second latch 135. The loader should then be pushed back behind the first catch 134 before switch 158 is opened to reset the controls. The timer can be adjustable to train speed, and its catching of a slow loader can set off an alarm. Similar circuits (the mirror image of these shown) are provided for the stop at the right controlled by switch 152R closed by a train from the right.

Referring to FIGS. 8, 9, and 15, pivot post 20 supports electrical contact rings 170 and 171 insulated apart and from the post and respectively engaged by brushes 172 and 173 on each loader under cover, FIG. 5. Rings 170 and 171 have respectively a conductive stopping segment 176 and 177 set into and insulated from the remainder of the ring and positioned for contact by brush 172 and 173 respectively when the loader is at the left and right-hand stopping place ahead of the transfer run with the train. A two-coil three-position push-pull relay 180 connects line 181 or 182 to the positive of battery 154 according to the train's movement. Stick relay 156, FIG. 14, closes a circuit from line 159 through its bottom front contacts to point "a", continued from "a" in FIG. 15 left-hand coil of relay 180 to ground to connect battery 154 to line 181. Likewise relay 180 is reversed by a train from the opposite direction. Lamps 184 and 185 are connected from respectively lines 181 and 182 to ground to indicate that the loader is set for the direction of the train. Line 181 is connected to ring 170 and line 182 to ring 171. Line 181 is connected through front contacts of isolation relay 186 to segment 176 and line 182 through isolation relay 187 to segment 177. The coil of each isolation relay is connected in parallel with the solenoid of respectively the valve 166 for controlling the left-hand and right-hand stops 120 to set the stops according to the direction for rotation. A circuit is closed from brush 172, line 188, left coil of reverse relay 190 to ground, and from line 188, normally closed right-side bump switch 102R, left contact of reverse switch 190, limit switch 118, line 191, series field of motor 90 connected through reverse relay 190, armature and shunt field of motor 90, in series to ground to operate the loader counterclockwise. The reverse coil of relay 190 is connected from brush 173 to ground in parallel with left-side bump switch 102L to open circuit through contacts of relay 190 to which motor 90 is reversely connected when relay 190 is reversed.

If computer control is used, a bar code 194, FIG. 2, or equal is applied central to each berth on each side of each car frame or sill and to each container and pallet and semitrailer at uniform heights. The berth code can designate berth length, railroad, car number, etc. Optionally a load code is inserted under a plastic cover adjacent the code 194 to designate the particular shipment, routing and destination. One or more scanners 196 are positioned on the far side of track T from the loaders to read the container, semitrailer and pallet codes on trains from the left and a code scanner 197 is positioned on either side of track T to read the berth codes on cars from the right. Computer 200 is fed code to request containers or pallets for that station (with loads or empty) in one bank 201 for incoming transfers and request empty cars in a second bank 202 for outgoing transfers and would subtract transfers made from those requested. A lamp 204 shines light across the top of the car pedestals to photoelectric cell 216 to detect empty berths in conjunction with scanner 197. The appropriate computer bank would be connected to load or unload a train according to its direction relative to slopes 30. Upon a scanner meeting a request on the computer bank connected, the loader in waiting position is started to engage at the correct time to press its fork against the forward pedestal on the berth selected for transfer before the rear fork reaches the locus of the pedestals, which with continued movement of the train and loader engages the fork between the pedestals. When the fork is fully engaged equally between the pedestals, slopes 30 in track 22 provide vertical displacement to load or unload the berth according to the direction of travel. When the forward fork arm leaves the forward pedestal the loader accelerates out from the train and can complete the transfer cycle.

The preferred pedestal car 9, FIGS. 1, 2, 17 and 18, is articulated into sections 16 each having one berth 19 central between centers of trucks 17 so that the car can transfer with loaders along either straight or curved track, the loader's arms remaining in alignment between the pedestals during transfer even with the car on curved track as long as the car is the correct distance from pivot 20 at closest approach.

Referring to FIGS. 17-21 and 23 and 24, each pedestal 18 has two spring closed load locks 220 opened by a fork arm 58 before and during transfer of a load to or from the car. Each lock is a vertical tab of a central conical section integral on top of a shaft 222. This triangular tab fits in the opening in the present corner casting of a container or pallet and is therein turned to lock the load to the car. Each shaft 222 extends down through a bearing sleeve on the pedestal to a spur gear 224 secured on the shaft 222. Each gear 224 is engaged with a gear rack 226 secured on shaft 228 which slides transversely to the car in C-guides 230 secured in the pedestal. Shaft 228 is keyed from revolving by the gear racks 226 which slide along the slot of the C-guides 230 as shaft 228 is shifted to turn tabs 220. A coil spring 232 at each end of shaft 228 centers the shaft in the pedestal. Shaft 228 has a reduced diameter step 234 at each end to slip fit within and seat on spring 232 which has a large outside diameter to also seat on the C-guide when shaft 228 is centered. A short vertical pin 236 secured central on shaft 228 is normally engaged in a circumferential slot 238 in disc 240 concentrically secured on a vertical shaft 242 through a central depressed section of the pedestal and turned by arm 246 extending inward the berth over the sill to be swung either way by a fork entering between the pedestals from either side of the car. A coil spring 248 surrounding shaft 242 has one end secured to disc 240 and the other end secured to the pedestal to hold arm 246 parallel to sill 16 when the fork is withdrawn. Arm 246 revolves disc 240 to shift shaft 228 and leave pin 236 when tabs 220 open 90° when lever arm 246 is turned but part way to the pedestal. Overtravel of arm 246 turns slot 238 away from pin 236, which then rests against disc 240 under pressure of a spring 232. When the fork is withdrawn, lever 246 is restored parallel to sill 16 by spring 248 turning disc 240 whose slot catches pin 236 and returns it with shaft 228 to center, rotating tab 220 90° to locked position. FIGS. 23 and 24 show respectively the locked and open positions of the load lock device within each pedestal.

Referring to FIGS. 25-27 for the preferred joint between sections of the articulated car 9, the end of one sill 16 is forked vertically and the end of the adjoining sill 16' is forked horizontally both surrounding ring 250 to form a universal joint with a transverse through pin 252 and a top vertical stub pin 254 aligning a bottom pin with depending eye 256 connected between upstanding flats 258 on the bolster of the supporting truck 17 by transverse pin 259.

Referring to FIGS. 17-22 and 28-31, side couplers 260 can be provided on car 9 for engaging behind the curved fork arm 58 to engage a standing loader. A side coupler 260 is mounted on the end of each pedestal 18 in a vertical hole or bearing block 262 one on each outer corner of the pedestal. Each coupler 260 has a vertical shaft 264 in bracket 262 and a coupling arm 266 secured to the bottom of shaft 264 extending horizontal lower than the bottom of pedestal 18 and bent up vertical on the coupling end to a height just below the top of the pedestal. Preferably a roller 268 is on this vertical engaging end to reduce friction when engaging along the fork. Each coupler in FIG. 29 is extended and retracted by an air cylinder 270 pivotally connected between arm 266 and the pedestal or sill under the pedestal. An air supply 272 is connected through four-way valve 274 to head ends of all four cylinders 270 for the berth to extend the couplers and is connected to their rod ends to retract the couplers 260. Valve 274 can be operated as valve 869 of FIG. 51 in my U.S. Pat. No. 3,483,829 or has a double operating horizontal arm 275 so it can be operated either manually or by trackway deflectors 276, FIG. 28, arranged as in FIG. 30 before and after station S and before and after any other transfer runs along track T to turn arm 275 horizontally, centrally pivoted to the bottom of the sill central the berth. Arm 275 is engaged by the first lifted deflector 276 to extend the couplers and is reset by the second deflector 276 on the opposite side of track center independent of which direction the car is turned or moving past station S. Deflectors 276 have a base plate 280 with holes for securing to ties of track T, a horizontal arm 282 secured at one end to the rod of a short vertical air cylinder 284 whose head end is secured through plate 280, a vertical finger 286 extending up from the opposite end of arm 282 to engage arm 278 when the head end of air cylinder 284 is connected to air pressure supply 168, and a spring 287 to force arm 282 against a stop 288 so arm 282 can recess outward after reversing arm 278 on a car 9 moving by.

In FIG. 31 the control arm is modified to 275' and directly connected to the coupler arms 266', which is preferred for toys and models of this invention. Stiff rods 290 connect coupling arms 266' with lever 275' as shown. Rotation of arm 275' counterclockwise will extend the side couplers. The couplers on both sides of the cars are extended together so those opposite the loader do not interfere with the forks.

Referring to FIGS. 32–37 for details of the dollies for station S, dolly 14 has a frame 290 with a sill 16', the same width as sill 16, with two end pedestals 292 on top deeper than fork arms 58 of loader 24 and between which the arms mesh as in FIGS. 32 and 33 along slope 32 up in track DT to lift a container from the fork traveling to the left or set it on the fork traveling to the right. Pedestals 292 each have a central conical locator 70 to engage in holes in the bottom of the container or pallet. The dolly is supported on four wheel units 294, FIGS. 34–36, each in a sleeve 296 depending from each corner of frame 290 and each having two flanged rail wheels 298 axled between side plates 300 straddled by U-bracket 302 centrally connected on transverse pin 304. A vertical tube 306 is secured on top of the U-bracket slides and turns and bottoms in sleeve 296. Coil spring 308 in tube 306 extends to keep wheels 298 on track DT.

Referring to FIGS. 1 and 37–39, the station dolly track not only has switches 34 and 35 to sorting tracks but can have wide-gage right-angle-take-off storage tracks WDT for dollys 14. Tracks WDT are connected to track DTL by a set of four turntables 310, spaced as are tubes 296 and connected by links 312 to gear 314 to be turned by rack 316 on rod of cylinder 318 to rotate all four tables together when each wheel on a dolly is on a table 310. Each table 310, FIGS. 38 and 39, has a plate 320, a center pin 321, a rail 322 with depending cup 323 for pin 321, and four rollers 324, two mounted between plates 326 supporting each end of rail 322 to roll on plate 320 about pivot 321. Flange guide 328 is preferably added along rail 322. Switch 310 is operated by manual control of cylinder 318.

In all the following variations like parts are given the same reference symbol or a suffixed one if modified enough for explanation.

Referring to FIGS. 40–45 for a loader station for rail to street interchange of semitrailers and to introduce a simpler loader 24A, which has no cradle on its arm 58A, the railroad track T and dolly track DT1 at station S1 are curved past the loader track to a centerline radius from pivot 20 to the load center of fork 44 for a transfer arc. Station S1 has short dollies runs DT1 replacing dolly track DT and simpler dollys 14A, since 90° switching is not provided. Each pallet 12 for dolly 14 or 14A has a floor 330 with shallow stiffening sides 332, locating holes 334, and "corner" castings 336 recessed in the bottom. Each dolly 14A has a rectangular frame 338 including a pedestal 292 with a conical locator 70 at each end to engage in holes 334, and a wheel and axle unit 340 supporting each end on track DT1. Each dolly track DT1 has a curve 342 for a transfer run and has a tangent run therefrom to a load dock or ramp 344 for a highway tractor 346 to meet semitrailer 11 on pallet 12 on dolly 14A. Track DT1 has a profile as in FIGS. 42 and 43 with an air cylinder 348 for cushioning and pushing the dolly from each dock 344 and a similar cylinder 349 at the empty dolly end where track DT1 is sloped down to a lower level to lower the dolly so arms of the loader pass over it without engaging. Cylinder 349 is extended to push the empty dolly up its track to its position in FIG. 42 to engage the forward arm of the loader from the right (counterclockwise) with the left pedestal of the dolly. The loader then moves the dolly up its track to engage the rear fork arm between the pedestals and set the pallet on the dolly and moves the dolly tangentially out from the fork on level track until the dolly starts down incline 352 at the left where it meets extended cylinder 348 which is then retracted to slowly dock the dolly for tractor 346 to drive trailer 11 off. When the pallet is reloaded and ready to be put on a train, cylinder 348 is extended to push the dolly up its track so a loader can engage between the dolly's pedestals and lift off the pallet and carry it clockwise to wait for an empty berth in a train moving to the left to engage fork arms 58A between the pedestals of the berth and set the pallet and its load thereon before swinging on around out from the train.

Referring to FIGS. 46–49 for a variation of the loader to handle dollies or detachable cradles and where cars 9B with more than one berth per car frame 360 are to be serviced, track T is straight and an alignment dolly 14B nests down in fork arms 58B of loader 24B. Dolly 14B is detachably mounted on pivot 362 on top of a central bracket arm 364 extending out from the frame of loader 24B and is supported on rollers 366 on fork arms 58B to swivel thereon as a cradle to align for transfer of a load. Dollies 14B have a center sill frame 290B with two top end plates 368 and transversely arranged wheels 370 for engaging wide-gage tracks DTW'. A finger 71B extends from each end of the loader side of the dolly and is bent down to engage the side of railway car 9B to rotate the dolly on arms 58B to align with the car as the loader is rotated through the transfer arc while lifted or lowered by slopes 30 in track 22 to transfer a load between the dolly and car.

Loaders 24B also differ from 24 and 24A in optional features shown, which are generally applicable: Legs 62B are mounted on pins 380 to swing in a radial arc, and wheels 26B are grooved to follow track 22. They can be switched to run on a second cam track 22B concentric with pivot 20 with reverse slopes 30B. Moveable-rail switches 384, FIG. 47 connect these tracks so wheels 26B can be switched to the reverse cam track 22B when desired to unload a train from the reverse direction (right to left) or load a train from the left. Switches are set straight except to switch loaders between tracks and are returned straight before transfer operation of the loaders.

Cars 9B are shown with side couplers 260, but these can be omitted with powered loaders controlled to engage selected berth in the train as in FIGS. 1–16, or other means can be used to engage and disengage the loader.

Referring to FIGS. 46 and 50–53, each dolly transfer track DTW' for station S2 has a ramp rail section 390 hinged at 392 to tilt up or down on cams 394 turned by gears and worm drive 396. When loader 24B is stopped by the dropped section 106B at each alignment with tracks DTW', arms 398, pivoted at 399, are swung up by cylinder 400 to hold the loader in alignment. The ramp rails 390 are then lifted to engage and lift off a dolly to roll away to the left. Ramp section 390 and arms 398 are lowered before the loader can be moved. The dolly is put on the loader by aligning the loader over the lowered ramp section 390, lifting the ramp slightly to intermediate position shown in phantom and moving the dolly to roll down the ramp over the fork, lowering the ramp 390 to set the dolly on arms 58B, and lifting stop section 106B to drive the loader around to wait for the train. The dolly then serves as a cradle to align with a berth during transfer and is not transferred to the train in this embodiment, since it is made shorter than to rest across the pedestals of a berth. This radial transfer of the dolly is not as simple as the nonstop tangential dolly transfer at stations S and S1.

Station S3, FIG. 54 is the same as station S1, FIG. 40, except the loaders 24B are used with a turntable cradle 60C in place of dolly 14B and designated 24C. Loaders with cradles enable the dolly tracks DT3 to be run straight in passing the loader track 22C which has slopes 30 down in the direction of arrows and spaced at wheel unit centers apart centered on the radius line from pivot 20 to tangency for each transfer run.

Station S4, FIG. 55, connects two railway tracks T and T' which can have dollies run thereon. Its loader 24 can move dollies 14A' or pedestal cars 9' along either track T or T' to transfer therebetween. The freight car 9' is positioned where shown to be engaged by the loader moving clockwise with the container shown being removed from a dolly 14A' to engage its forward (left-hand) arm against the inner face of pedestal 18 at the left end of car 9' and move the car left along its track to open hold-downs 218 and deposit the container thereon and withdraw the arms, locking the container on the car as the loader turns away from the car. Dolly 14A' is the same as 14A except large cushioning bumpers 404 are mounted on the ends.

Container and pallet loads can be sorted by a train passing station S5, FIG. 56, to a plurality of loader track loops 22 each having several loaders 24 on which the loads for a particular train can be held until that train passes to receive those from that loop. The loaders about each post 20 can be of different constructions such as 24C' which have a T-frame instead of a triangular one.

The loaders for some applications need not be powered nor run a full circle but need only be moved back and forth on a transfer arc.

The basic loaders can be moved by any suitable means, such as a rope of correct length from a forward car in the train or the forward end of the car for transfer back to the loader to turn the loader fork between pedestals of the berth for transfer and to continue turning the loader out away from the train before the rope is released. For this, a bent rod or rope horn 406 is added to the top of each side of the loader frame and positioned ends out as in FIGS. 48 and 49 so a rope placed around the far horn to pull the loader will slip off when the loader has completed the transfer arc.

Arms 58C of loader 24C, FIG. 57, are curved angle 408 turned one leg in and one up and a curved flat 410 welded atop the inner edge of the angle to support tapered rollers 68' on shafts 69 between the flat and vertical leg. Center bar 364 has a vertical pin 412 replacing pivot cone 362 if cradle 60C is to remain on the arms.

The preferred cradle 60C, FIG. 58, that sits on arms 58C, FIG. 57, has two curved ends similar to dolly 14B and made of angle with one leg turned out and one down and covered by a plate 414 connected by an angle 416 along the back side having a bar 418 extending in from the center of the side to a pivot hole 419 on the load center to fit over pin 412 on the loader. A conical locator 70 is central at each end to engage in holes in the containers and pallets. An alignment pin 71' extends down from each end of member 416 to engage the side of car 9B or dolly 14A or is made or adjustable to engage the sill of car 9 and dolly 14 to gage thereon to turn the cradle to align therewith for transfer.

Optionally the arm of the loader can be an angle 408, FIG. 59, and the cradle 60C' therefore have rollers 68C on shafts 69C radial to pivot 418 between depending flats concentric to pivot 419 to support the cradle on the arm. Though the central pivot can be omitted with the addition of horizontal guide wheels on the outer corners of the cradle to engage the inner side of the upturned leg of angle 408, it is preferred to retain pivot 418 as the preferred guide to keep the dolly or cradle central. These constructions enable the side coupler 260 room to extend up behind and nearly to the top of the arms.

Referring to FIGS. 60 and 61, loader 24D has separate outer coupling fork 25' and inner load support fork 25" of inturned channels in which wheels 68D on cradle 60D run to support the cradle as it turns on its central pivot 418. This enables the cradle to extend down between the inner fork arms and the side couplers 260 to reach to the top of the fork without interfering with the cradle or the load.

Loader 24E, FIGS. 62–63, is mounted on the bed of a platform vehicle 420 which runs on rails 422 between railway tracks T and T' with room to set container 10 or pallet 12 between lift pedestals 424. Each pedestal 424 has a central lift cylinder 426 and a guide rod 428 to keep the pedestal from turning. Each pedestal 424 lowers so the fork arms of the loader can clear them and lifts so a container or pallet on the fork can be lifted off. The loader is then moved on track 422 away until the loader's fork is out from under the load. Conical locators 70 hold the load in place on the pedestals which are lowered and lifted in opposite pairs for transfer. The loader can transfer to or from a standing or moving railway car or vehicle and in either case vehicle 420 can be moving. The loader is optionally driven around pivot 20 by a cable 426 over sheeves 428 on bed 430 of vehicle 420 and traction cable drive 432 through about 360°. The loader is moved on track 422 to engage and disengage its forks under loads on pedestals 424 and to transfer with a standing vehicle along tracks T or T' which can be in a driveway D for trucks for setting the loads on lift pedestals 18T on truck bed 434. Pedestals 18T preferably are lifted as are pedestals 48 in FIGS. 14–16 of U.S. Pat. No. 4,130,208.

The loader of FIGS. 64–65 is applied to a gantry 440 which runs on rails 442, has a live center pivot 20F to which the frame 444 of loader 24F is secured to revolve with and pivoted to tilt up and down at the fork end. Frame 444 curves down from pivot 20F to its curved load fork 25 and is supported by a hydraulic lift cylinder 446 connected between the fork and a circular track 22F suspended from the gantry concentric on pivot 20F. Wheels 448 on top of the rod of cylinder 446 run on track 22F. The lower end of cylinder 446 is mounted with side bracing on pin 450 between the fork arms. Gear 452 on top of pivot 20F is driven by gearmotor 90F on top of the gantry to turn the loader. Track 22F preferably has slopes 30 on opposite ends to transfer loads to and from vehicles moving along tracks T while the gantry can be stationary.

The loader 24G of FIGS. 66–67 is designed for a short radius with sides of the frame 44G radiating apart from pivot 20 at an angle approaching 180°. Rubber covered rollers 460 along the inner engaging sides of pedestals 18' reduce the friction and noise of transfer.

Loader 24H, FIGS. 68–69, has a frame 44H mounted at right angles on a sleeve 462 on mast 20H and braced by rods 466 to support container 10 on the curved fork arms 58 to revolve about the mast. Track T runs by pivot 20H at closest point at a distance to center the fork over a berth 19 on car 9B. The loader is supported by wheel 26H under its boom frame 44H on track 22H with a slope 30 for transfer of loads between car 9B and arms 58, the fork arms meshing between the pedestals on the car like a gear tooth for movement with the car as the sleeve with boom 44H is moved around and up or down on the mast.

For passengers, express, mail, etc. the containers need not be the full width of the car, and the forks can reach under the floor of an aisle past the passenger berth. The pedestals can be ledges in the ends of the berth enclosure.

Referring to FIG. 70, loader 24J has a frame 44J with a central tube 470 pivoted to post 20 to revolve therearound and tilt in a radial plane, a vertical load yoke 472 optional in lieu of a fork and pivoted on vertical pin 476 held by vertical bracing on the outer end of frame 44J and supported on track 22 by wheels 26 on ends of a cross frame member 478. Yoke 472 has a hook pin 480 at each end which engages in an eye 482 on the side of passenger container 10P in berth 19P in car 9P having an aisle 484 past the berth. A V-depression 486 at each eye 482 guides pin 480 to center of eye 482. A side coupling double latch block 290 central of and below berth 19P is engaged by a vertical pin 492 on the end of a radial coupling ram 494 which telescopes into tube 470 against coil spring 496 or equal and extends over half the length of frame tube 470 to a stop before and after each transfer to gradually accelerate and decelerate the loader when pin 492 is latched in block 290. Details of a latch block applicable are shown in FIGS. 15 and 16 of my U.S. Pat. No. 4,065,006. A slope 30 in each rail of track 22 lowers the loader when at right angles to the car to set the container down in berth 19P or lift it out according to which direction the car is moving the loader. Yoke 472 acts as a cradle to align during transfer.

Referring to FIGS. 71–76 for another alternative side coupling between a loader and vehicle, loader 24K has vertical coupling rollers 268 each mounted on the outer end of a coupling rod 494K extending slip fit through a tube 500 each mounted radially along each side of the loader frame 44K. Loader 24K rides on a double rail cam track 22, high on the right as viewed from the fork end, with slopes 30 spaced apart in each rail for wheels 26B on each side to keep the loader level lengthwise car 9K. Bracket 502 supports a class one lever 504 on pin 506 over each side of the loader. The lower end of each lever 504 is connected by a link 508 to the inner end of rod 494K along that side. The top end of lever 504 has weight W to swing the lever down to extend rod 494K to latch between side coupling latches 290K on railway car 9K. Referring to FIGS. 72–74, latches 290K on the left end of car 9K or berth 19 are positioned lower than those at the right end so the coupling roller 268K on the right engages the right high coupling 290K to bring the loader counterclockwise to tangency (transfer alignment with the car) at which time (as shown by arrows) the loader is lowered level, engaging the left roller 268K between the latches 290K at the left and lowering the right roller down from between the latches at the right to move out on the car as shown in FIG. 72.

Having thus described some embodiments and applications of my invention I do not wish to be limited to those disclosed herein but intend to cover this invention by the appended claims together with all variations, applications, and parts which are within the true spirit and scope of this invention.

I claim as my invention:

1. A load transfer device for tangential moving transfer which has a radial arm member arranged to rotate about a single vertical axis member to substantially describe an arc for moving transfer, load cradle means on said arm member substantially free to have limited rotation about a substantially vertical axis on said arm member, means for turning said cradle means to align with a load substantially parallel to a plane tangent to said arc over a portion of the arc for transfer in which said cradle means moves through tangeneg with said arc for transfer as said arm member is rotated about said vertical axis member, and means for lifting or lowering said cradle means while moving in said arc substantially parallel to said plane for transfer of the load.

2. A rotary loader system for railway containers and pallets including at least one berth having upstanding ends for supporting a container thereon and at least one rotary loader having in combination a single vertical supporting pivot, at least one arm mounted to radiate from and rotate around said pivot, coupling and load engaging said alignment support means on the end of said arm curved horizontally on a radius from a point at the middle of the berth when said arm is fully extended thereover to engage and locate between the ends of the berth when the arm is revolved in an arc, means for providing relative tangential movement between the arc of turning of the arm and the berth for rotating the arm when engaged with the berth, and means for changing the relative elevation between said berth and said arm when extended over said berth to effect transfer of a load between said arm and said berth.

3. A loader as in claim 2, said arm being a generally triangular frame of isosceles form with its two leg sides radiating generally in a plane from said pivot and extending beyond the base of the triangle to form said coupling and load engaging and alignment support means by the extensions of these sides being curved on said radius, said means for changing the relative elevation between said berth and said arm including two concentric cam tracks about said pivot and wheel means on each said track each supporting a side leg of the triangle in the proximity of its base, said frame being mounted to said pivot to swing up and down in a vertical plane and to rotate about a line substantially bisecting the triangle, said cam tracks having substantially equal slopes circumferentially spaced apart by the same distance as that separating the wheel means to lift or lower the sides of the triangle substantially equally together.

4. A rotary loader having a single vertical pivot post, at least one load arm pivotally mounted and supported to rotate horizontally through an arc about said post, load engaging and support means on the end of each said arm opposite said pivot post, each said load engaging means having outer side edges curved convex in a horizontal plane such that, during motion of a load carrying conveyance in a path tangential to said arc, said load engaging means will mesh between ledges on the conveyance for transfer of a load to or from the conveyance.

5. A loader as in claim 4, said support means being curved fork arms having cradle means thereon for parallel alignment with a load over the conveyance.

6. A loader as in claim 5, said cradle means being a cradle piece curved to fit and travel along on top of each of said fork arms, and means resiliently extending each said cradle piece outward on each of said fork arms and a depending locator on each said cradle piece for engaging the conveyance to align the cradle means transversely thereto during transfer.

7. A loader as in claim 5, said cradle means being a cradle on each of said fork arms mounted for travel therealong, resilient means extending each said cradle outward on its fork arm a depending finger on each said cradle to engage a support for a load to align the cradle for load transfer while the loader is extended over the conveyance to align for load transfer over said arc of.

8. A rotary loader comprising a single substantially vertical pivot, at least one loader arm connected to and supported to revolve around said pivot and extending radially therefrom, load engaging and support means on the end of each said arm opposite to said pivot, said load support means being curved convex along the out facing sides as viewed in plan view for side coupling by engaging between transverse vertically faced ledges on a vehicle, means for supporting said arm to rotate around said pivot, and means for providing relative vertical movement between the loader and the vehicle while engaged therewith in alignment for transfer of a load to or from the vehicle by engagement and movement of said arm over an arc tangent with the vehicle path.

9. A loader as in claim 8, said pivot being a round column extending above said arm, a sleeve on said column, said arm being secured to said sleeve, and guying means being the high end of said sleeve and said arm to support a load on said arm, including a cam track about said column close thereto relative to the length of said arm, and cam wheel means for supporting said arm on said cam track.

10. A loader as in claim 8 said vehicle comprising a railway pedestal car for transfer of loads with said loader, said car having a plurality of sills and trucks articulated together, and two transverse end pedestals equally spaced from said trucks on each of said sills for said arms to engage between the said pedestals on any one of the said sills for load transfer over a load transfer run on either curved or straight track in which relative vertical movement between said car and said arms effects load transfer.

11. A loader as in claim 8, and a railway track for said vehicle passing said loader, said track being curved to a radius from said pivot to position said load engaging and support means in alignment over said track for a transfer arc on said radius, said means for providing relative vertical movement including slope means in said arc to transfer a load.

12. A loader as in claim 11, said track being a dolly track and at least one dolly thereon having transverse pedestals for said load engaging and support means to engage between for transfer of a load thereon.

13. A loader as in claim 8, said load engaging and support means including curved fork arms and self aligning cradle means for engaging the load for transfer, said cradle means being mounted to turn horizontally on said fork arms and having depending locators to turn said cradle means for aligning on the vehicle for transfer of a load thereon.

14. A loader as in claim 13 said cradle means being a dolly having ends curved convex to be engaged by said fork arms to nest on said curved fork arms and to rotate horizontally to turn said dolly to align under a load on said vehicle for moving transfer and to be set down and moved to separate from said loader for storing the load on the dolly.

15. A loader as in claim 13, said cradle means being a load cradle, and said loader arm having a central extension arm extending out to the center of the load cradle and having pivot means thereat to align said cradle to turn on said fork arms.

16. A loader as in claim 8 and a vehicle for cooperating therewith having transverse vertically faced ledges spaced apart lengthwise of the vehicle for said load engaging and support means to closely fit between for movement with the vehicle through an arc about said pivot tangential to the path of the vehicle.

17. A loader as in claim 16, said load engaging and support means including a fork with outer curved coupling arms on the outer end of said arm and having outer engaging faces curved convex to engage the vehicle within alignment tolerance for transfer of a load, said vehicle having side coupling arms mounted to extend from said vehicle to engage the concave inner face of the said coupling arm closest to and pointing toward the approaching said vehicle to accelerate the loader gradually to couple with the vehicle.

18. A loader as in claim 16 and means for propelling each said loader arm around said pivot to engage said load engaging and support means between said ledges to move with the vehicle to transfer a load to or from the vehicle and to disengage said loader from the vehicle by the loader turning on said pivot.

19. A loader as in claim 18, said means for propelling being operable to rotate said arm to engage and move said vehicle tangentially past said loader for load transfer therewith.

20. A loader as in claim 8, said means for supporting being a circular track substantially concentric with said pivot and wheel means on each said arm for running on said track.

21. A loader as in claim 20, said track having two concentric rails, there being two said wheel means each spaced apart on a separate said rail, said rails having corresponding slopes circumferentially spaced apart the same as said wheel means to lift and lower both sides of the arm together as it travels around said pivot on said track to transfer long loads substantially level.

22. A loader as in claim 20, each said wheel means having at least one grooved wheel to run on said track and a leg extending up from each said wheel means and hinged to said arm to swing in a plane radial to said pivot to compensate for variations of the radius of said track.

23. A loader as in claim 22, said means for supporting including two circular tracks concentric about said pivot and having opposite slopes, one track having the slope for lifting and the other track having the slope for lowering the loader's arm according to the direction of rotation for transfer, and means for switching said wheel means between said tracks.

* * * * *